US012665465B2

(12) United States Patent
Todaka et al.

(10) Patent No.: US 12,665,465 B2
(45) Date of Patent: Jun. 23, 2026

(54) ROTARY ELECTRIC MACHINE HOUSING AND MANUFACTURING METHOD THEREOF

(71) Applicant: HONDA MOTOR CO., LTD., Tokyo (JP)

(72) Inventors: Hirosumi Todaka, Saitama (JP); Yasunari Kimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 226 days.

(21) Appl. No.: 18/618,612

(22) Filed: Mar. 27, 2024

(65) Prior Publication Data

US 2024/0333078 A1     Oct. 3, 2024

(30) Foreign Application Priority Data

Mar. 29, 2023     (JP) ................................. 2023-053995

(51) Int. Cl.
*H02K 5/20*          (2006.01)
*B33Y 10/00*         (2015.01)
(Continued)

(52) U.S. Cl.
CPC .............. *H02K 5/203* (2021.01); *B33Y 10/00* (2014.12); *H02K 15/14* (2013.01); *B33Y 80/00* (2014.12)

(58) Field of Classification Search
CPC .......... H02K 5/20; H02K 5/203; H02K 15/14; H02K 9/19; B33Y 10/00; B33Y 80/00
See application file for complete search history.

(56) References Cited

U.S. PATENT DOCUMENTS

2015/0159668 A1\*  6/2015  Oda ........................ F04D 17/10
                                                         62/470
2017/0138259 A1    5/2017  Juretzek
                   (Continued)

FOREIGN PATENT DOCUMENTS

JP        2002-147249 A      5/2002
JP        2007-159277 A      6/2007
                   (Continued)

OTHER PUBLICATIONS

English translation of WO-2022107429-A1 (Year: 2022).\*

*Primary Examiner* — Tulsidas C Patel
*Assistant Examiner* — Joshua Kiel M Rodriguez
(74) *Attorney, Agent, or Firm* — Paratus Law Group, PLLC

(57)          ABSTRACT

A rotary electric machine housing accommodates a rotary electric machine. The rotary electric machine housing has a body portion, a gas flow path through which a gas flows, an oil flow path through which an oil flows, and a refrigerant flow path through which a refrigerant flows inside. The refrigerant flow path includes a rotary electric machine heat exchange part in which the refrigerant exchanges heat with the rotary electric machine, a gas heat exchange part in which the refrigerant exchanges heat with the gas flowing through the gas flow path, and an oil heat exchange part in which the refrigerant exchanges heat with the oil flowing through the oil flow path. The rotary electric machine heat exchange part, the gas heat exchange part, and the oil heat exchange part are provided in series along a flow direction of the refrigerant.

11 Claims, 16 Drawing Sheets

(51) Int. Cl.
  B33Y 80/00        (2015.01)
  H02K 15/14        (2025.01)

(56)                References Cited

U.S. PATENT DOCUMENTS

2020/0256343 A1*   8/2020   Sakota ................. F04D 25/082
2021/0123348 A1*   4/2021   Hafner ................... F01D 5/005
2022/0325664 A1   10/2022   Yazaki et al.

FOREIGN PATENT DOCUMENTS

JP        2017-527728 A      9/2017
JP        2022-157785 A     10/2022
WO     WO-2022107429 A1 *   5/2022   ......... H01M 10/615

* cited by examiner

SECOND
END SIDE

FIRST
END SIDE

⟶ : REFRIGERANT
— · — · ⟶ : COMPRESSED AIR

SECOND
END SIDE

FIRST
END SIDE 40, 56

E 40, 56

59

59

51

50

B

50a

59

30, 52

58

58

58

60

E

B

⟶ : REFRIGERANT
--- ⟶ : OIL 41, 40　　　57, 56　　　41, 40

ROTARY ELECTRIC MACHINE HOUSING AND MANUFACTURING METHOD THEREOF

CROSS-REFERENCE TO RELATED APPLICATIONS

This application is based on and claims priority under 35 USC 119 from Japanese Patent Application No. 2023-053995 filed on Mar. 29, 2023, the entire content of which is incorporated herein by reference.

TECHNICAL FIELD

The present disclosure relates to a rotary electric machine housing configured to accommodate a rotary electric machine, and a manufacturing method thereof.

BACKGROUND ART

In recent years, researches and developments have been conducted on weight reduction which contributes to improvement in energy efficiency in order to allow more people to have access to affordable, reliable, sustainable and advanced energy. For example, research and development have been conducted on weight reduction of a system including a rotary electric machine such as an electric motor or an electrical generator.

An internal combustion engine such as a gas turbine engine may be coupled to the rotary electric machine. For example, JP2022-157785A, JP2017-527728A, JP2007-159277A, and JP2002-147249A disclose a rotary electric machine coupled to a gas turbine engine. Such a rotary electric machine is rotated by electric power from a battery to start up the gas turbine engine, or driven by the gas turbine engine to generate electric power. The rotary electric machine generates heat during rotation, and a mechanism for cooling the rotary electric machine is provided. For example, a refrigerant jacket through which a refrigerant flows is provided in a housing that accommodates the rotary electric machine (for example, JP2022-157785A).

In addition, in the rotary electric machine to which the gas turbine engine is coupled, high-temperature compressed air extracted from the gas turbine engine is cooled by a heat exchanger and then supplied to the rotary electric machine (for example, JP2022-157785A, JP2017-527728A, and JP2007-159277A). The compressed air supplied to the rotary electric machine cools the rotary electric machine.

Further, an oil for cooling a stator and lubricating and cooling a bearing, for example, is supplied to the rotary electric machine.

Since the compressed air extracted from the gas turbine engine has a high temperature, the compressed air needs to be cooled before being supplied to the rotary electric machine. Further, when the oil used for cooling components of the rotary electric machine is circulated and supplied to the rotary electric machine again, the oil needs to be cooled before being supplied to the rotary electric machine. When a heat exchanger for cooling the compressed air and a heat exchanger for cooling the oil are separately provided, the entire system including the rotary electric machine and the heat exchangers is large.

Therefore, it is considered to cool the compressed air and the oil by the refrigerant jacket provided in the housing. In a case where the refrigerant jacket includes a heat exchange part for the rotary electric machine, a heat exchange part for the compressed air and a heat exchange part for the oil, in order for each heat exchange part to have sufficient heat exchange performance, it is necessary to cause the refrigerant of an appropriate flow rate to flow through each heat exchange part. Depending on an arrangement of the respective heat exchange parts, a total flow rate of the refrigerant increases, a size of a pump for causing the refrigerant to flow increases, and the number of pumps increases, so that it is preferable to realize a refrigerant jacket including a plurality of heat exchange parts.

SUMMARY OF INVENTION

The present disclosure provides a rotary electric machine housing which enables to accommodate a rotary electric machine to which a gas and an oil are supplied, and to prevent an increase in a total flow rate of a refrigerant flowing through a heat exchange part, and a manufacturing method thereof. The present disclosure further contributes to improvement of energy efficiency.

An aspect of the present disclosure relates to a rotary electric machine housing configured to accommodate a rotary electric machine, the rotary electric machine housing having:

a body portion having an accommodation space in which the rotary electric machine is accommodated;

a gas flow path provided in the body portion and through which a gas to be supplied to the rotary electric machine flows;

an oil flow path provided in the body portion and through which an oil to be supplied to the rotary electric machine flows; and a refrigerant flow path provided in the body portion and through which a refrigerant flows inside, in which the refrigerant flow path includes:

a rotary electric machine heat exchange part in which the refrigerant exchanges heat with the rotary electric machine;

a gas heat exchange part in which the refrigerant exchanges heat with the gas flowing through the gas flow path; and an oil heat exchange part in which the refrigerant exchanges heat with the oil flowing through the oil flow path, and the rotary electric machine heat exchange part, the gas heat exchange part, and the oil heat exchange part are provided in series along a flow direction of the refrigerant.

Another aspect of the present disclosure relates to a manufacturing method of manufacturing the rotary electric machine housing by additive manufacture, the manufacturing method including:

integrally forming the body portion, the gas flow path, the oil flow path, and the refrigerant flow path.

According to the present disclosure, an increase in a total flow rate of the refrigerant flowing through the heat exchange part can be prevented.

BRIEF DESCRIPTION OF DRAWINGS

Exemplary embodiment(s) of the present invention will be described in detail based on the following figures, wherein.

DESCRIPTION OF EMBODIMENTS

Hereinafter, an embodiment of a rotary electric machine housing of the present disclosure will be described with reference to the accompanying drawings.
(Composite Power System)

Figure 1:
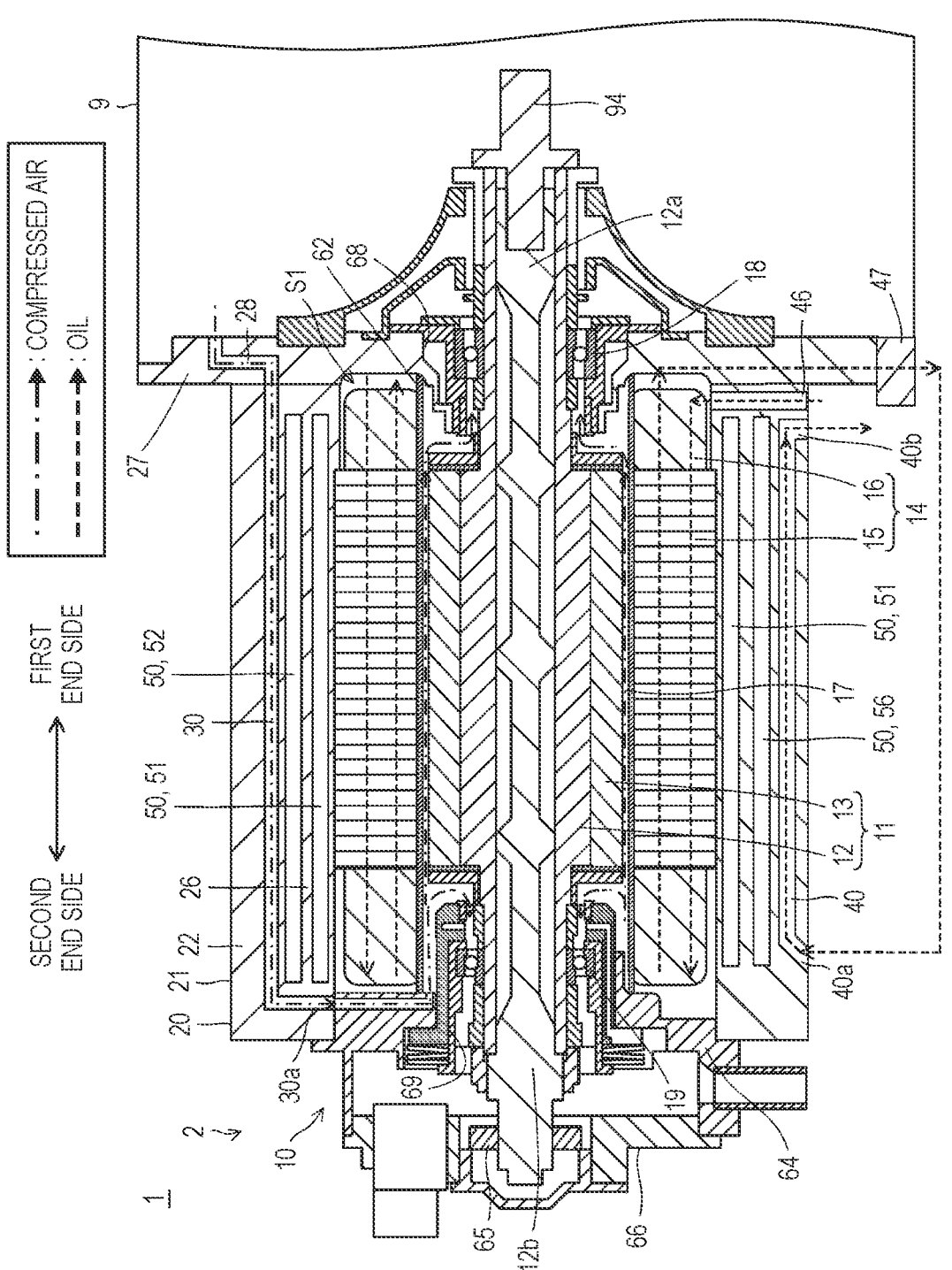
FIG. 1 is a schematic side cross-sectional view of a rotary electric machine system 2.
Figure 2:
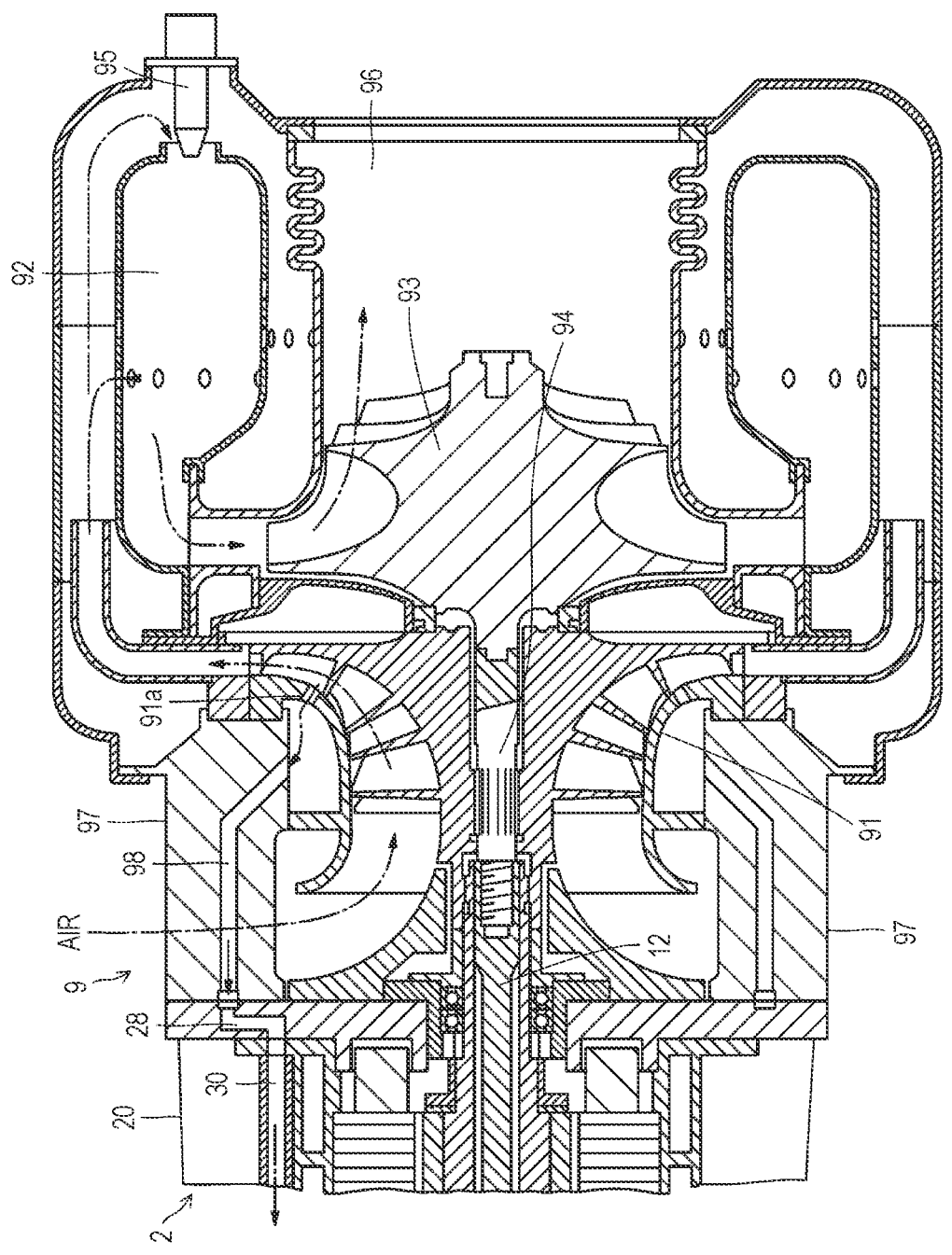
FIG. 2 is a schematic side cross-sectional view of a gas turbine engine 9 coupled to the rotary electric machine system 2.

First, a composite power system 1 will be described. The composite power system 1 includes a rotary electric machine system 2 and a gas turbine engine 9. FIG. 1 is a schematic side cross-sectional view of the rotary electric machine system 2, and FIG. 2 is a schematic side view of the gas turbine engine 9 which is an internal combustion engine coupled to the rotary electric machine system 2. In FIG. 1, a gas flow path 30, an oil flow path 40, and a refrigerant flow path 50 are conceptually shown, and detailed shapes thereof will be described with reference to FIGS. 3 to 8 and FIGS. 12 to 17. Hereinafter, in the description of the rotary electric machine system 2, a gas turbine engine 9 side in an axial direction of the rotary electric machine system 2 is also referred to as a first end side, and a side opposite to the first end side in the axial direction is also referred to as a second end side.

The rotary electric machine system 2 and the gas turbine engine 9 are disposed on the same axis. The composite power system 1 can be used as, for example, a power source for propulsion in a flying object such as a drone, a ship, an automobile, or the like, or a power source for an auxiliary power source in an aircraft, a ship, a building, or the like. When being mounted on a flying object, such as a multi-copter, the composite power system 1 functions as a power drive source that rotationally biases a motor constituting a lift generator, such as a prop or a ducted fan. The composite power system 1 functions as a screw torque generator when being mounted on a ship. The composite power system 1 functions as a power drive source that rotationally biases a motor when being mounted on an automobile. In addition, the composite power system 1 can be applied to a gas turbine power generation facility. In the present embodiment, the gas turbine engine 9 also serves as a gas supply source for supplying compressed air to be described later to the rotary electric machine system 2.

As shown in FIG. 1, the rotary electric machine system 2 includes a rotary electric machine 10 and a rotary electric machine housing 20 (hereinafter, simply referred to as a housing 20) capable of accommodating the rotary electric machine 10. The rotary electric machine 10 is accommodated in an accommodation space S1 that is an inner space of the housing 20. Details of the housing 20 will be described later.

The rotary electric machine 10 is, for example, a motor generator, and is rotated by electric power from a battery (not shown) to start up the gas turbine engine 9 or driven by the gas turbine engine 9 to generate electric power. The rotary electric machine 10 includes a rotor 11 and a stator 14.

The rotor 11 includes a rotor shaft 12 and a plurality of permanent magnets 13. An end portion 12a of the rotor shaft 12 on the first end side in the axial direction and an end portion 12b on the second end side are supported by the housing 20 via a pair of bearings 18 and 19, respectively. Further, an output shaft 94 of the gas turbine engine 9 is coupled to the end portion 12a of the rotor shaft 12. The plurality of permanent magnets 13 are held by the rotor shaft 12.

The stator 14 is disposed radially outward of the rotor 11. The stator 14 includes an electromagnetic coil 15 and a plurality of insulating base materials 16. The electromagnetic coil 15 is a three-phase coil including a U-phase coil, a V-phase coil, and a W-phase coil. The insulating base materials 16 are arranged in a circular ring shape, and the electromagnetic coil 15 is wound around the insulating base materials 16.

A cylindrical partition wall 62 is provided between the rotor 11 and the stator 14. The partition wall 62 extends from the end portion of the housing 20 on the first end side to the end portion on the second end side, and divides the accommodation space S1 into a space in which the rotor 11 is accommodated and a space in which the stator 14 is accommodated. The partition wall 62 is disposed slightly apart from an outer peripheral surface of the rotor 11 in a radial direction, and an air gap 17 is formed between the partition wall 62 and the rotor 11.

Oil is supplied to the rotary electric machine 10 from an outside. In the present embodiment, the oil is supplied to the pair of bearings 18 and 19 and the stator 14. Specifically, the oil is supplied to the pair of bearings 18 and 19 from an oil supply port (not shown), for example, in a jet flow state, and the bearings 18 and 19 are lubricated and cooled. The oil is supplied to the stator 14 from an oil supply port 46 provided on the first end side of the housing 20. The oil supplied to the stator 14 cools the stator 14 and is discharged from an oil discharge port 47 provided on the first end side of the housing 20.

As shown in FIG. 2, the gas turbine engine 9 includes a compressor 91, a combustor 92, a turbine 93, and the above-described output shaft 94.

The compressor 91 compresses air sucked from the outside to generate compressed air. In FIG. 2, flows of the air and the compressed air are indicated by one-dot chain lines. The compressor 91 is coupled to the output shaft 94, and rotates due to rotation of the rotor shaft 12 of the rotary electric machine 10 or rotation of the turbine 93.

The compressed air generated by the compressor 91 and fuel injected from a fuel supply source 95 are supplied to the combustor 92. The fuel is combusted together with the compressed air to generate high-temperature combustion gas. The combustion gas is discharged to the outside through a nozzle 96 disposed downstream of the combustor 92.

The turbine 93 is coupled to the output shaft 94. The turbine 93 is provided in the nozzle 96 and rotates by an exhaust flow of the combustion gas generated by the combustor 92. When the turbine 93 rotates, the rotor shaft 12 coupled to the output shaft 94 also rotates. Thus, the rotary electric machine 10 generates electric power. The compressor 91 and the turbine 93 start rotating when the rotary electric machine 10 is rotated by electric power from a battery (not shown), but after the output shaft 94 is rotated at a high speed, electric power supply from the battery to the rotary electric machine 10 is stopped.

The gas turbine engine 9 includes leg portions 97 provided radially outward of the compressor 91 and coupled to the housing 20. A plurality of (for example, six) leg portions 97 are provided at predetermined intervals along a circumferential direction, and air flows into the compressor 91 from gaps between adjacent leg portions 97.

The gas turbine engine 9 further includes extraction flow paths 98. The extraction flow paths 98 are respectively provided in the leg portions 97. The compressor 91 is provided with extraction ports 91a, and the extraction flow paths 98 are in communication with the extraction ports 91a and a gas inlet 28 provided in the housing 20. Thus, a part of the compressed air flows from the extraction ports 91a to the extraction flow paths 98, and flows into the gas flow paths 30 of the housing 20 via the extraction flow paths 98 and the gas inlet 28. Details of the gas flow path 30 will be described later.

After flowing through the gas flow paths 30, the compressed air is supplied to the accommodation space S1 from a gas supply part 30a provided on the second end side of the gas flow paths 30 as shown in FIG. 1. More specifically, the compressed air is supplied to a space of the accommodation space S1 in which the rotor 11 radially inward of the partition wall 62 is accommodated. In FIG. 1, a flow of the compressed air is indicated by a one-dot chain line. The compressed air supplied to the accommodation space S1 flows to the bearing 19, the air gap 17 between the rotor 11 and the stator 14, and the bearing 18. The compressed air flowing to the bearings 18 and 19 functions as an air curtain such that the oil supplied to the bearings 18 and 19 is not scattered to the rotor 11. The compressed air that has entered the air gap 17 reduces generation of heat in the air gap 17 caused by rotation of the rotor 11. The compressed air passes through the bearings 18 and 19 and is discharged from a discharge port (not shown) to the outside of the rotary electric machine system 2.

(Rotary Electric Machine Housing)

Figure 3:
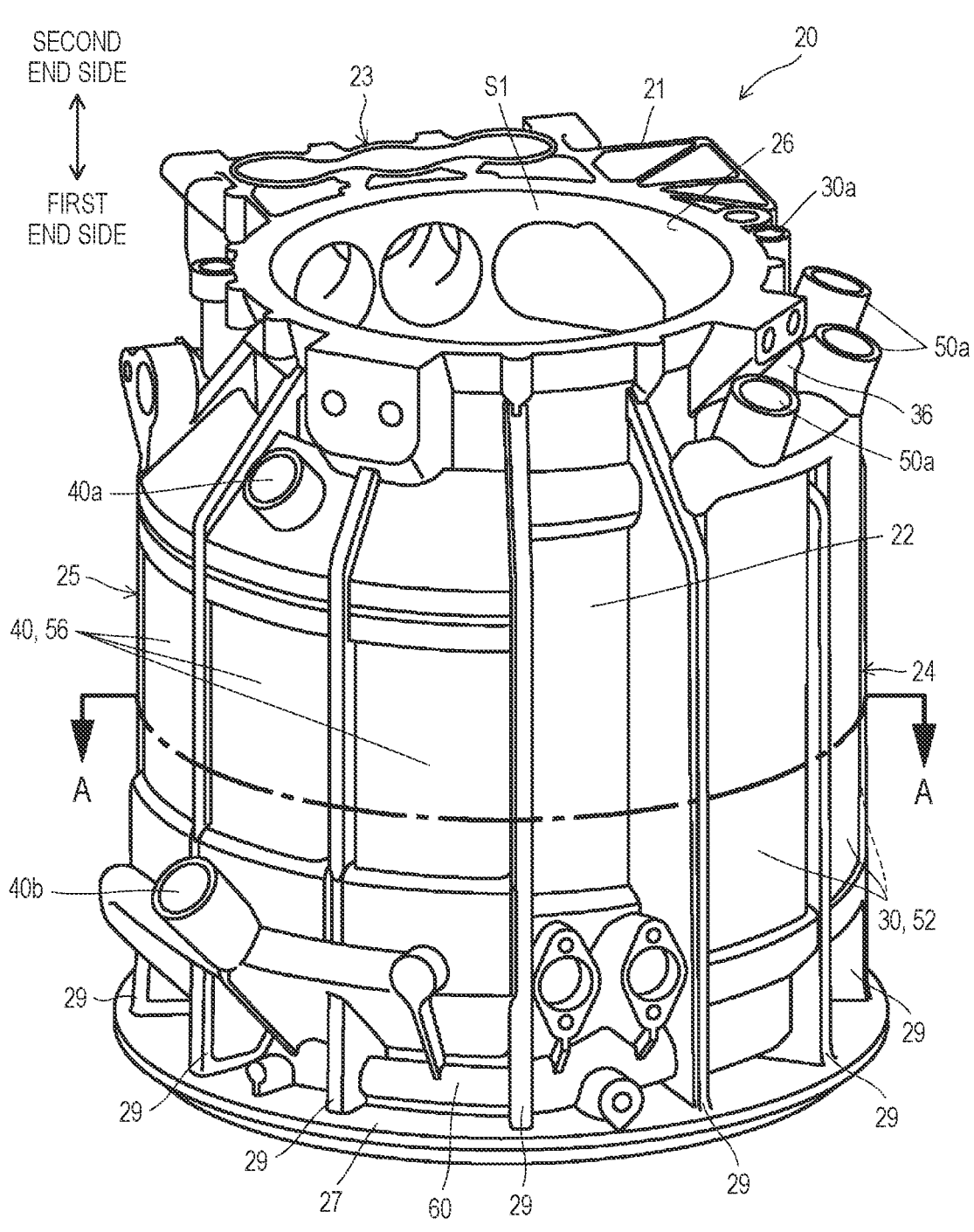
FIG. 3 is a perspective view of a rotary electric machine housing 20 that accommodates a rotary electric machine 10.
Figure 4:
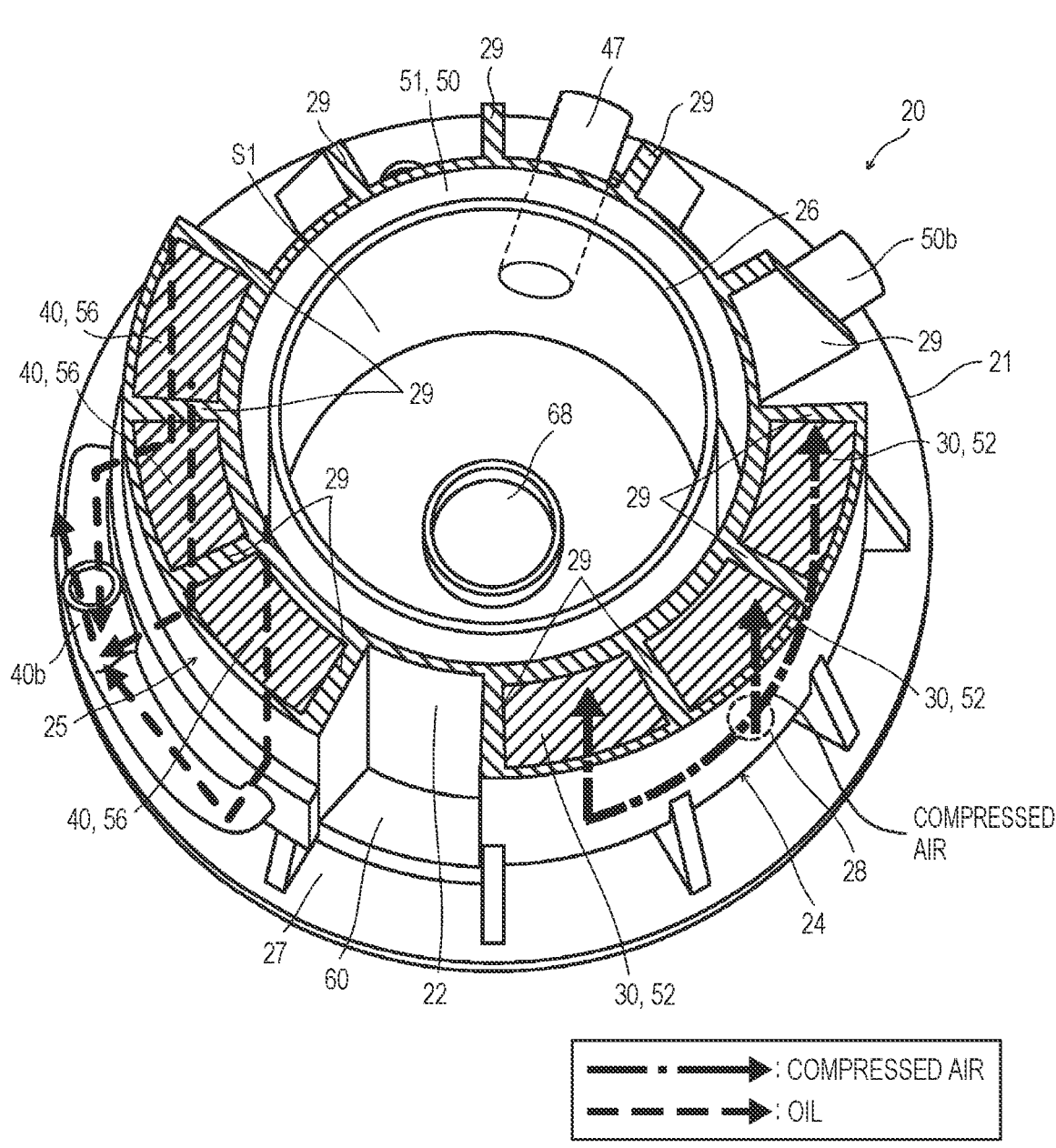
FIG. 4 is a perspective view of a cross section of the rotary electric machine housing 20 taken along a line A-A in FIG. 3.

Next, the housing 20 will be described. FIG. 3 is a perspective view of the housing 20. FIG. 4 is a perspective view of a cross section taken along a line A-A in FIG. 3.

The housing 20 includes a body portion 21, the gas flow paths 30, the oil flow paths 40, and the refrigerant flow path 50.

The body portion 21 is a member having the accommodation space S1 in which the rotary electric machine 10 is accommodated. The body portion 21 has an outer wall 22 having a cylindrical shape. The outer wall 22 includes a terminal arrangement portion 23, a gas flow path arrangement portion 24, and an oil flow path arrangement portion 25. The terminal arrangement portion 23 is provided with electric terminals for transmitting and receiving electric power between the rotary electric machine 10 and an external device (not shown). Specifically, a U-phase terminal, a V-phase terminal, and a W-phase terminal (not shown) of the electromagnetic coil 15 are arranged in the terminal arrangement portion 23. The gas flow path arrangement portion 24 is provided with the gas flow paths 30 through which the compressed air flows and gas heat exchange parts 52 (to be described later) through which a refrigerant flows. The gas flow path arrangement portion 24 extends along the axial direction of the rotary electric machine 10. The oil flow path arrangement portion 25 is provided with the oil flow paths 40 through which an oil flows and oil heat exchange parts 56 (to be described later) through which the refrigerant flows. The oil flow path arrangement portion 25 extends along the axial direction of the rotary electric machine 10.

The terminal arrangement portion 23, the gas flow path arrangement portion 24, and the oil flow path arrangement portion 25 are arranged at intervals of about 120 degrees in a circumferential direction of the outer wall 22. With such an equal-interval arrangement relationship, deviation of a position of the center of gravity of the housing 20 can be prevented.

The outer wall 22 includes a plurality of ribs 29 extending in the axial direction of the rotary electric machine 10. The plurality of ribs 29 are provided at equal intervals over the entire circumferential direction of the outer wall 22. The plurality of ribs 29 can improve the rigidity of the housing 20.

The body portion 21 has the above-described outer wall 22 and an inner wall 26 provided with a gap in the radial direction from an inner peripheral surface of the outer wall 22, that is, has a double cylindrical shape. A space radially inward of the inner wall 26 corresponds to the accommodation space S1 described above.

The body portion 21 further includes a bottom wall 27 provided on the first end side of the outer wall 22. The bottom wall 27 has a substantially circular plate shape and is attached to the leg portions 97 of the gas turbine engine 9 by bolts (not shown). The bottom wall 27 defines the accommodation space S1 together with the inner wall 26. The bottom wall 27 is provided with a through hole 68 through which the rotor shaft 12 is inserted, and supports the end portion 12a of the rotor shaft 12 via the bearing 18.

The bottom wall 27 is provided with the gas inlet 28 that is in communication with the extraction flow paths 98 of the gas turbine engine 9 and the gas flow paths 30. The gas inlet 28 is a flow path that guides the compressed air extracted from the gas turbine engine 9 to the gas flow paths 30.

In addition, although not shown in FIG. 3, as shown in FIG. 1, the body portion 21 further includes a rotor support portion 64 provided on the end portion of the outer wall 22 on the second end side. The rotor support portion 64 is provided with a through hole 69 through which the rotor shaft 12 is inserted, and supports the end portion 12b of the rotor shaft 12 via the bearing 19. The rotor support portion 64 defines the accommodation space S1 together with the inner wall 26 and the bottom wall 27. The rotor support portion 64 is provided with a resolver 65 that detects a rotation parameter and a resolver holder 66 that holds the resolver 65.

The gas flow path 30 is provided in the body portion 21, and is a flow path through which the gas to be supplied to the rotary electric machine 10 flows. The gas flow path 30 is provided at the gas flow path arrangement portion 24 of the body portion 21, and extends in the axial direction of the rotary electric machine 10. Specifically, a first end side of the gas flow path 30 in the axial direction is in communication with the extraction flow path 98 of the gas turbine engine 9 via the gas inlet 28, and high-temperature compressed air flows through the gas flow path 30. A second end side of the gas flow path 30 is in communication with the accommodation space S1 and includes the gas supply part 30a for supplying the compressed air to the accommodation space S1. The high-temperature compressed air is cooled by the gas heat exchange parts 52 while flowing through the gas flow paths 30, and is supplied from the gas supply part 30a to the accommodation space S1.

The oil flow path 40 is provided in the body portion 21, and is a flow path through which the oil to be supplied to the rotary electric machine 10 flows. The oil flow path 40 is provided at the oil flow path arrangement portion 25 of the body portion 21, and extends in the axial direction of the rotary electric machine 10. The oil flow path 40 has an oil inflow port 40a provided on the second end side and an oil outflow port 40b provided on the first end side.

Regarding detailed description of a flow of the oil, as described above, the oil supplied from the oil supply port 46 (see FIG. 1) provided in the housing 20 to the accommodation space S1 cools the stator 14 and is then discharged from the oil discharge port 47 to the outside of the accommodation space S1. The oil discharge port 47 is in communication with the oil inflow port 40a of the oil flow path 40 via a connection pipe (for example, a hose) (not shown). The high-temperature oil that receives heat from the stator 14 is guided from the oil discharge port 47 to the oil inflow port 40a. Thereafter, the oil flows through the oil flow paths 40 and is cooled by the oil heat exchange parts 56. The oil cooled by the oil heat exchange parts 56 is supplied again from the oil outflow port 40b to the accommodation space S1 through the oil supply port 46 via a connection pipe and an oil pump (not shown). In this way, the oil is circulated and supplied to the rotary electric machine 10.

FIGS. 5 to 8 show a flow of the refrigerant in the refrigerant flow path 50. The refrigerant flow path 50 is provided in the body portion 21, and is a flow path through which a refrigerant (for example, cooling water) flows inside. The refrigerant flow path 50 is a so-called water jacket. The refrigerant flow path 50 has a refrigerant supply port 50a into which the refrigerant flows from the outside and a refrigerant discharge port 50b from which the refrigerant flows out to the outside.

As shown in FIGS. 3 to 8, the refrigerant flow path 50 includes a rotary electric machine heat exchange part 51, the gas heat exchange parts 52, and the oil heat exchange parts 56. Although details will be described later, the refrigerant flows into the refrigerant flow path 50 from the refrigerant supply port 50a, flows through the gas heat exchange parts 52, the oil heat exchange parts 56, and the rotary electric machine heat exchange part 51 in this order, and is discharged to the outside of the refrigerant flow path 50 from the refrigerant discharge port 50b.

The rotary electric machine heat exchange part 51 cools each component (particularly, the stator 14) of the rotary electric machine 10 by exchanging heat between the refrigerant and the rotary electric machine 10. The rotary electric machine heat exchange part 51 has a cylindrical shape and is a flow path of the refrigerant flowing in a space between the outer wall 22 and the inner wall 26 of the body portion 21.

The gas heat exchange part 52 cools the compressed air by exchanging heat between the refrigerant and the compressed air flowing through the gas flow path 30. The gas heat exchange part 52 is provided in the gas flow path arrangement portion 24 of the body portion 21 and extends in the axial direction of the rotary electric machine 10.

The oil heat exchange part 56 cools the oil by exchanging heat between the refrigerant and the oil flowing through the oil flow path 40. The oil heat exchange part 56 is provided in the oil flow path arrangement portion 25 of the body portion 21 and extends in the axial direction of the rotary electric machine 10.

The gas heat exchange parts 52 and the oil heat exchange parts 56 are disposed radially outward of the rotary electric machine heat exchange part 51. With such a configuration, an increase in a size of the housing 20 in the axial direction can be prevented.

Since the refrigerant flow path 50 includes the gas heat exchange parts 52 and the oil heat exchange parts 56 in addition to the rotary electric machine heat exchange part 51, the compressed air and the oil supplied to the rotary electric machine 10 are cooled by the refrigerant flow path 50. In other words, since a function of cooling the rotary electric machine 10, a function of cooling the compressed air, and a function of cooling the oil are integrated in the refrigerant flow path 50, it is not necessary to provide a heat exchanger for cooling the compressed air and the oil separately from the refrigerant flow path 50. Accordingly, in the housing 20 of the present embodiment, a heat exchange mechanism for cooling the rotary electric machine 10, the compressed air, and the oil can be made compact.

Figure 5:
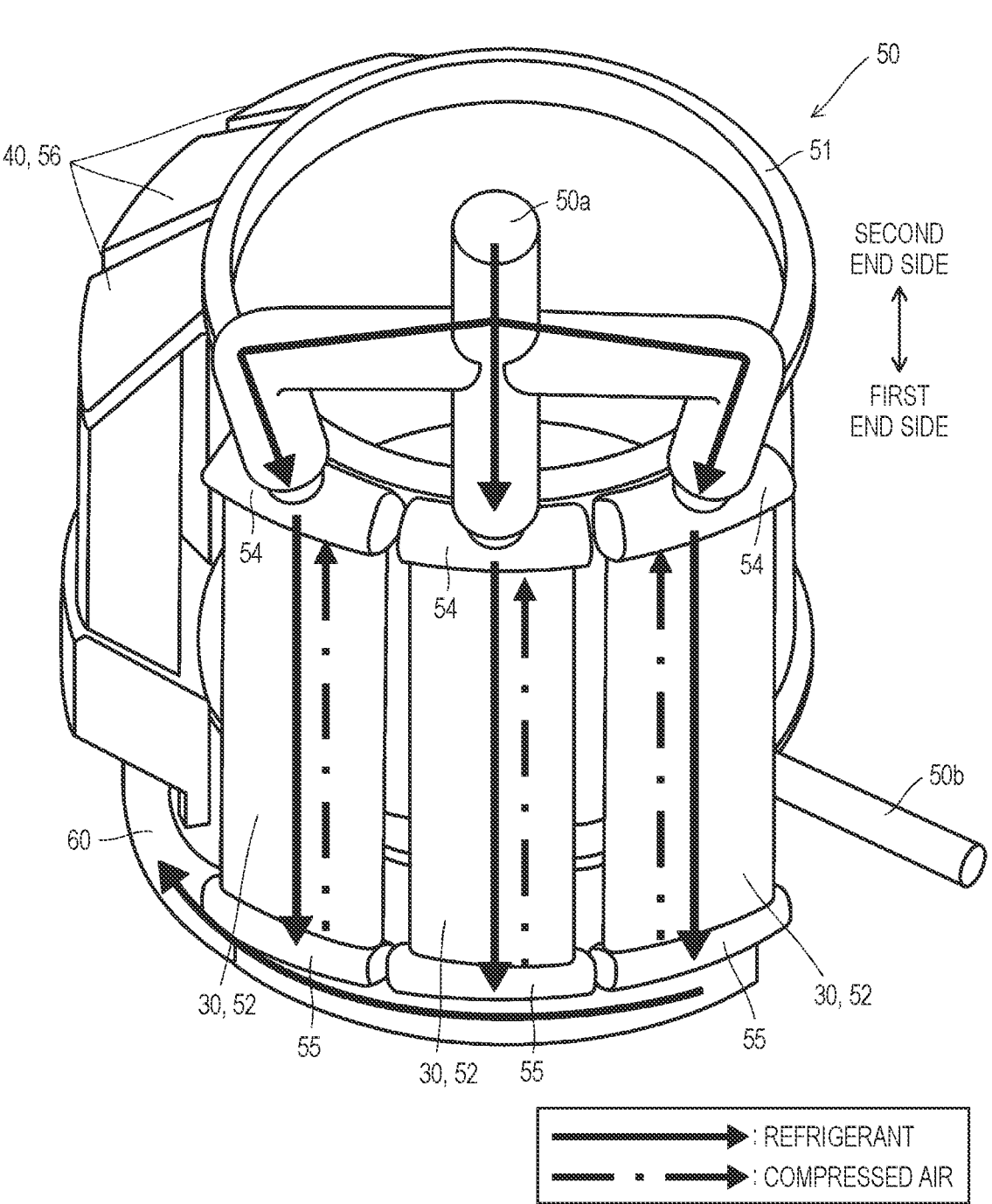
FIG. 5 is a view showing flows of a refrigerant in gas heat exchange parts 52 and flows of compressed air in gas flow paths 30.
Figure 6:
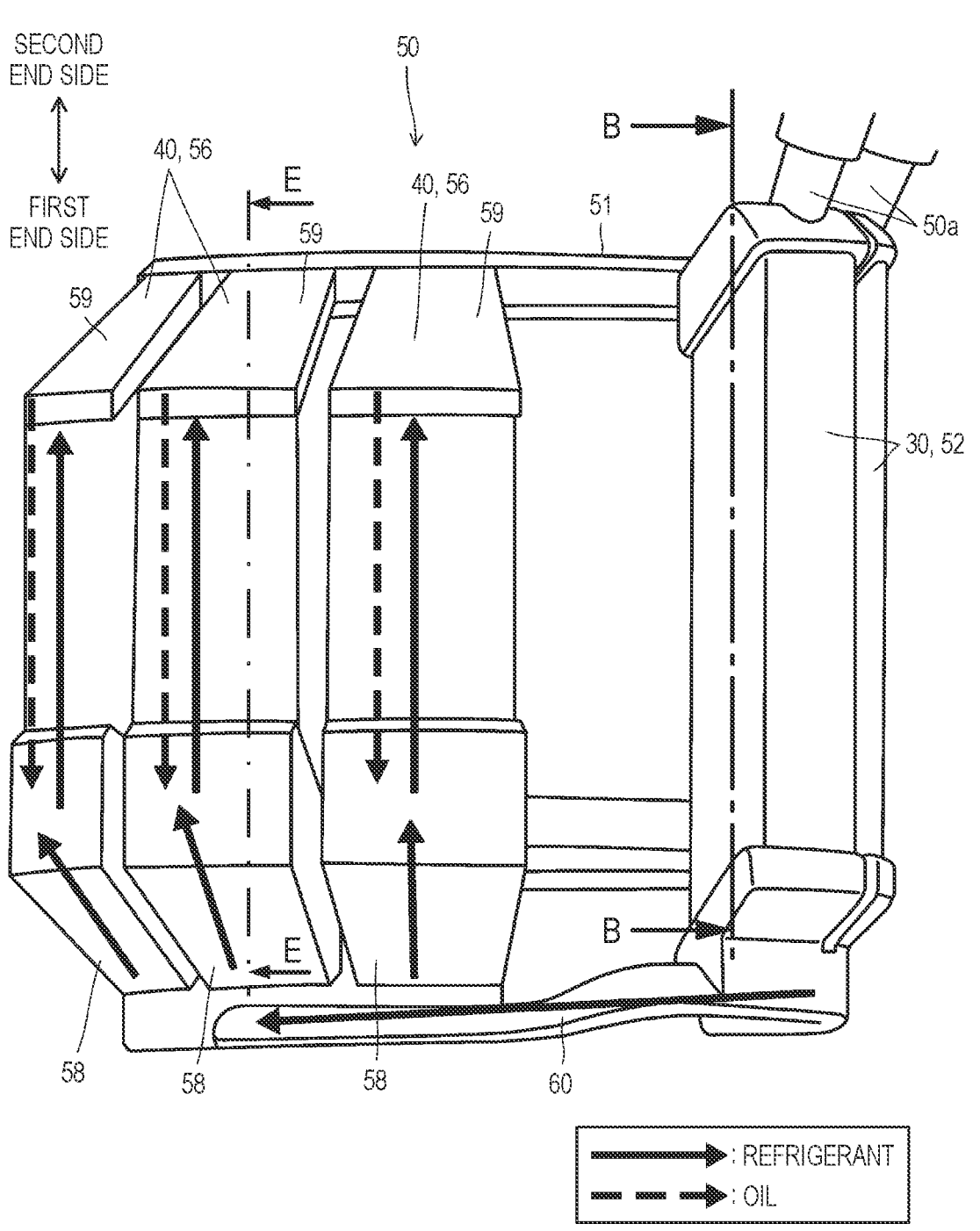
FIG. 6 is a view showing flows of the refrigerant in oil heat exchange parts 56 and flows of oil in oil flow paths 40.
Figure 7:
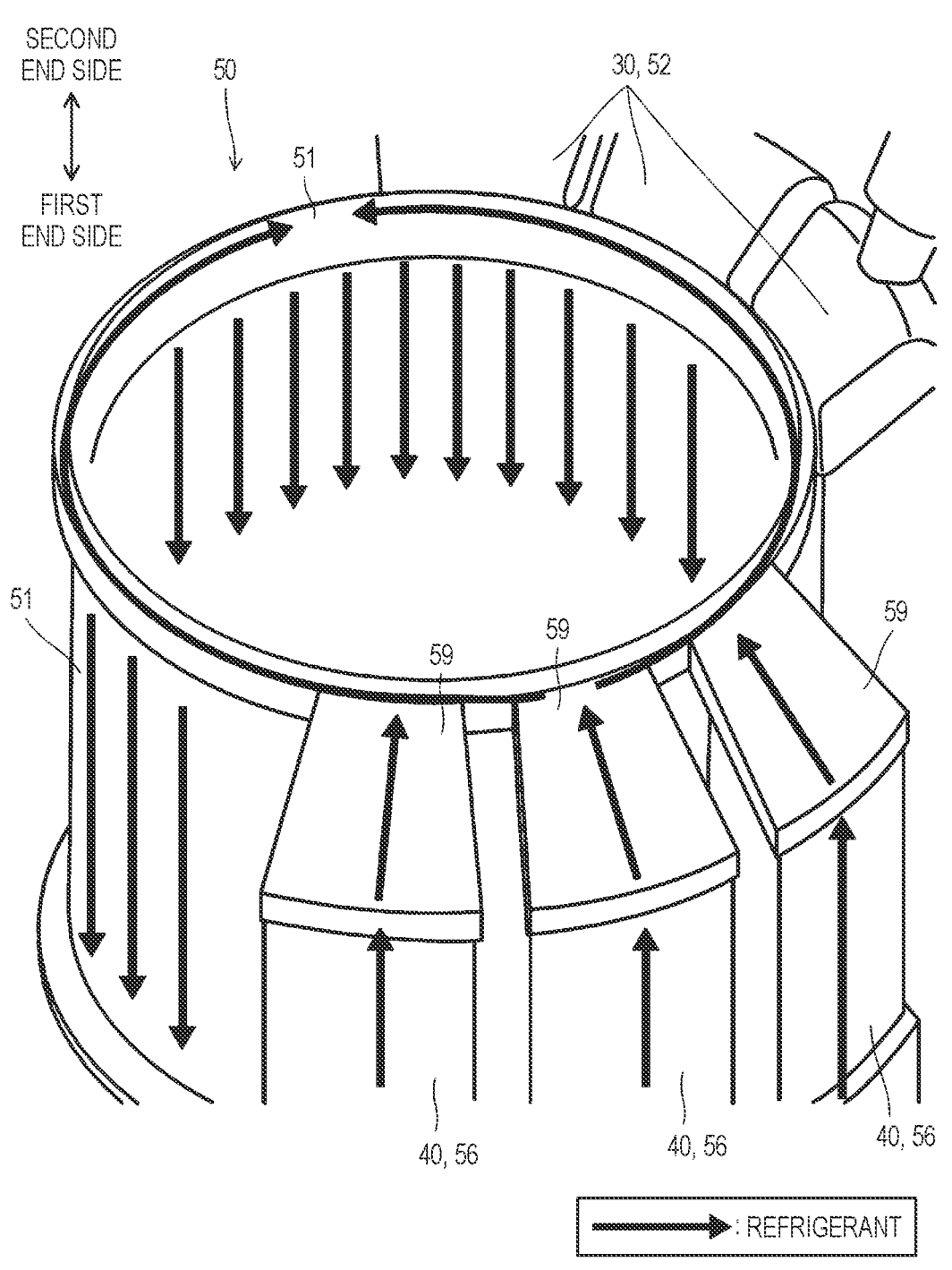
FIG. 7 is a view showing flows of the refrigerant flowing from the oil heat exchange parts 56 to a rotary electric machine heat exchange part 51.
Figure 8:
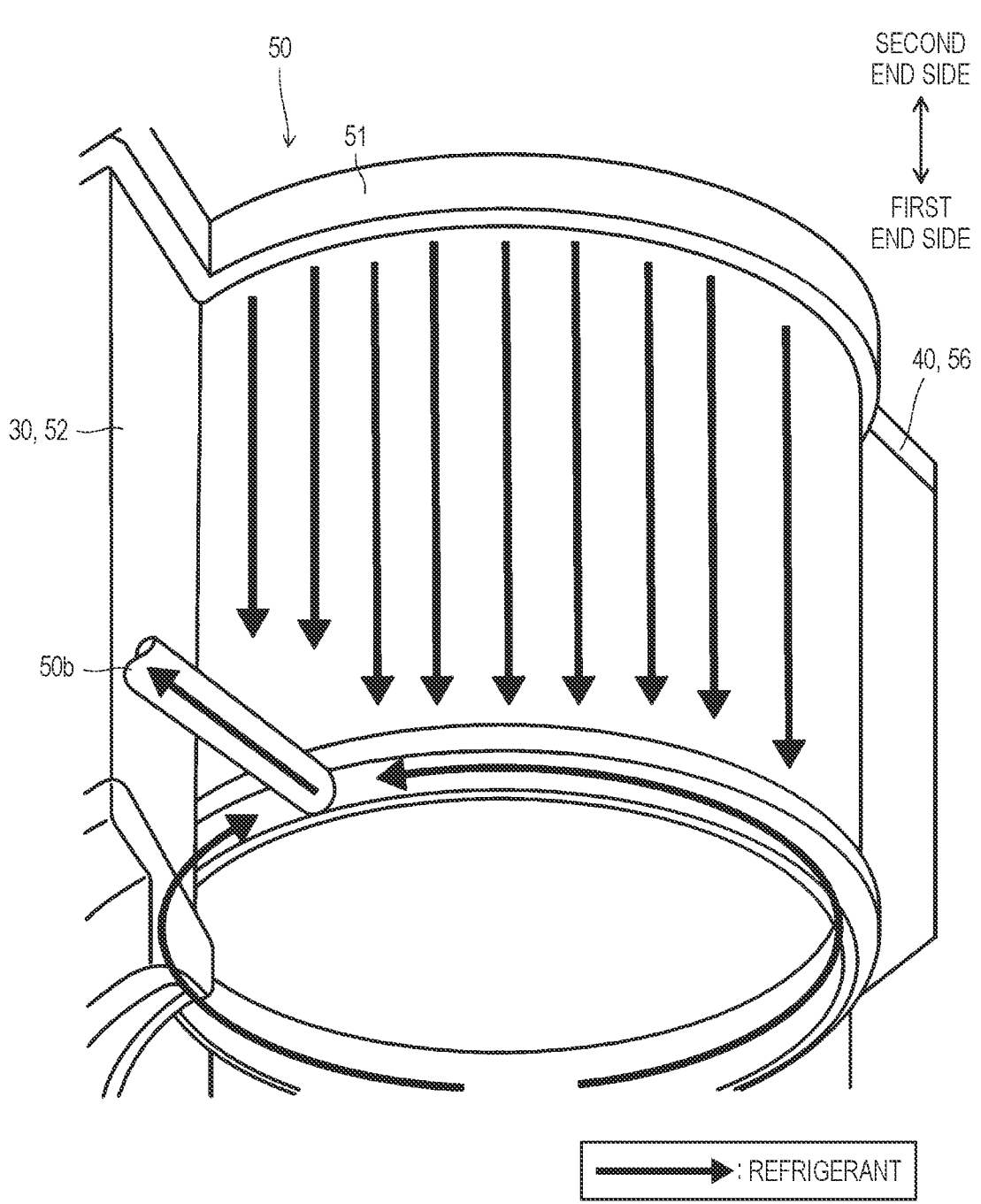
FIG. 8 is a view showing flows of the refrigerant flowing from the rotary electric machine heat exchange part 51 to a refrigerant discharge port 50b.

Next, the flow of the refrigerant will be described in detail with reference to FIGS. 5 to 8. As shown in FIG. 5, the refrigerant flowing in from the refrigerant supply port 50a first flows through the gas heat exchange parts 52 and exchanges heat with the compressed air flowing through the gas flow paths 30. In the gas heat exchange part 52, the refrigerant flows from the second end side toward the first end side. Next, the refrigerant flows through a relay flow path 60 that couples the gas heat exchange parts 52 and the oil heat exchange parts 56. The relay flow path 60 is a flow path provided along the circumferential direction of the outer wall 22. Next, as shown in FIG. 6, the refrigerant flows through the oil heat exchange parts 56 and exchanges heat with the oils flowing through the oil flow paths 40. In the oil heat exchange part 56, the refrigerant flows from the first end side toward the second end side. As shown in FIG. 7, the oil heat exchange parts 56 and the rotary electric machine heat exchange part 51 are connected to each other on the second end side, and the refrigerant flows into the rotary electric machine heat exchange part 51. The refrigerant flows through the rotary electric machine heat exchange part 51 and exchanges heat with the rotary electric machine 10, particularly the stator 14. Here, when the refrigerant flows from the oil heat exchange parts 56 into the rotary electric machine heat exchange part 51, the refrigerant branches into a path flowing clockwise and a path flowing counterclockwise. Accordingly, deviation in a flow rate distribution of the refrigerant flowing through the rotary electric machine heat exchange part 51 having a cylindrical shape can be prevented from occurring. As shown in FIG. 8, in the rotary electric machine heat exchange part 51, the refrigerant flows from the second end side toward the first end side, and is discharged to the outside of the refrigerant flow path 50 from the refrigerant discharge port 50b provided on the first end side.

Figure 9:
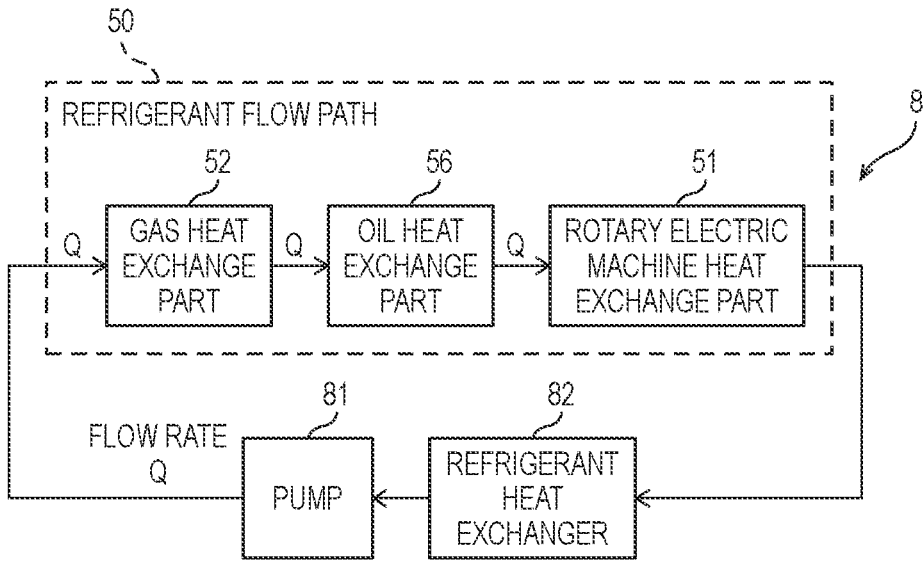
FIG. 9 is a diagram showing a refrigerant flow path 50 of the present embodiment in which the gas heat exchange part 52, the oil heat exchange part 56, and the rotary electric machine heat exchange part 51 are provided in series.

FIG. 9 shows a circulation flow path 8 through which the refrigerant circulates. The refrigerant flow path 50 constitutes a part of the circulation flow path 8. A pump 81 and a refrigerant heat exchanger 82 are provided in the circulation flow path 8. The pump 81 and the refrigerant heat exchanger 82 are provided outside the rotary electric machine system 2. The refrigerant discharged from the refrigerant discharge port 50b of the refrigerant flow path 50 is cooled by the refrigerant heat exchanger 82 and then supplied to the refrigerant flow path 50 again.

As described above, the gas heat exchange part 52, the oil heat exchange part 56, and the rotary electric machine heat exchange part 51 are provided in series along the flow direction of the refrigerant. According to such a configuration, when a flow rate of the refrigerant required for each of the heat exchange parts 51, 52, and 56 (that is, a flow rate of the refrigerant required to sufficiently cool the rotary electric machine 10, the compressed air, and the oil) is Q, one pump 81 capable of sending the refrigerant to the refrigerant flow path 50 at the flow rate Q may be provided as shown in FIG. 9.

Figure 10:
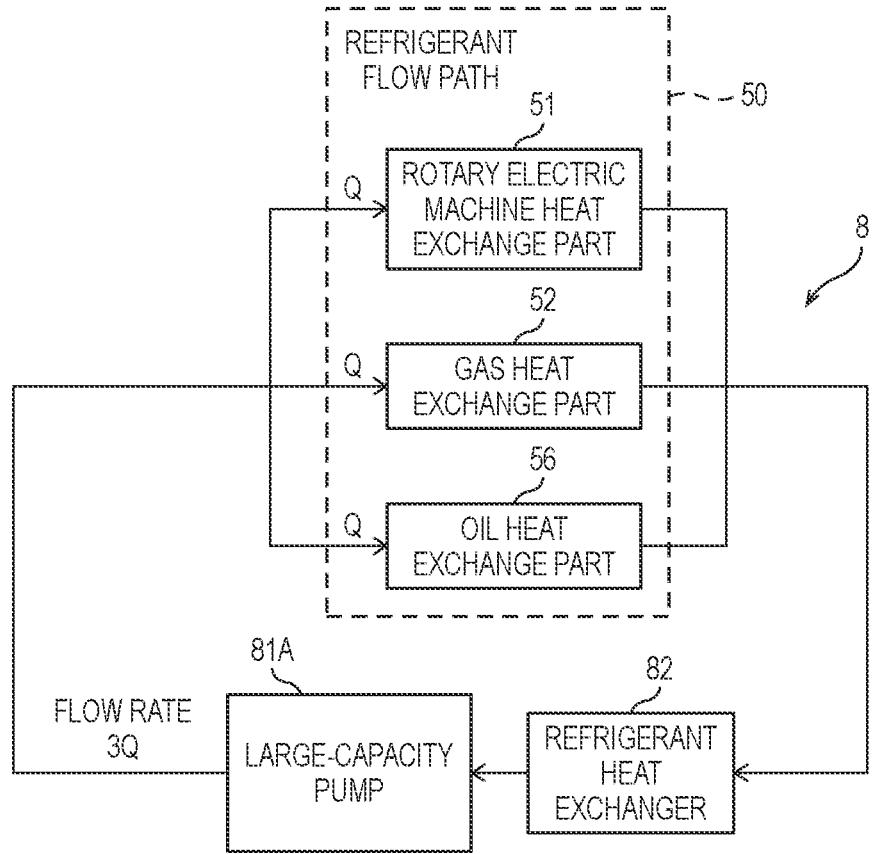
FIG. 10 is a diagram showing the refrigerant flow path 50 of a first comparative example in which the gas heat exchange part 52, the oil heat exchange part 56, and the rotary electric machine heat exchange part 51 are provided in parallel.

FIG. 10 shows a first comparative example in which the rotary electric machine heat exchange part 51, the gas heat exchange part 52, and the oil heat exchange part 56 are provided in parallel. In this case, when a flow rate of the refrigerant required for each of the heat exchange parts 51, 52, and 56 is Q, a large-capacity pump 81A that feeds the refrigerant to the refrigerant flow path 50 at a flow rate three times (that is, a flow rate of 3Q) that in the present embodiment is required. Meanwhile, in the present embodiment, since it is sufficient to provide only one pump 81 capable of feeding the refrigerant to the refrigerant flow path 50 at the flow rate Q, a size of the pump can be reduced.

Figure 11:
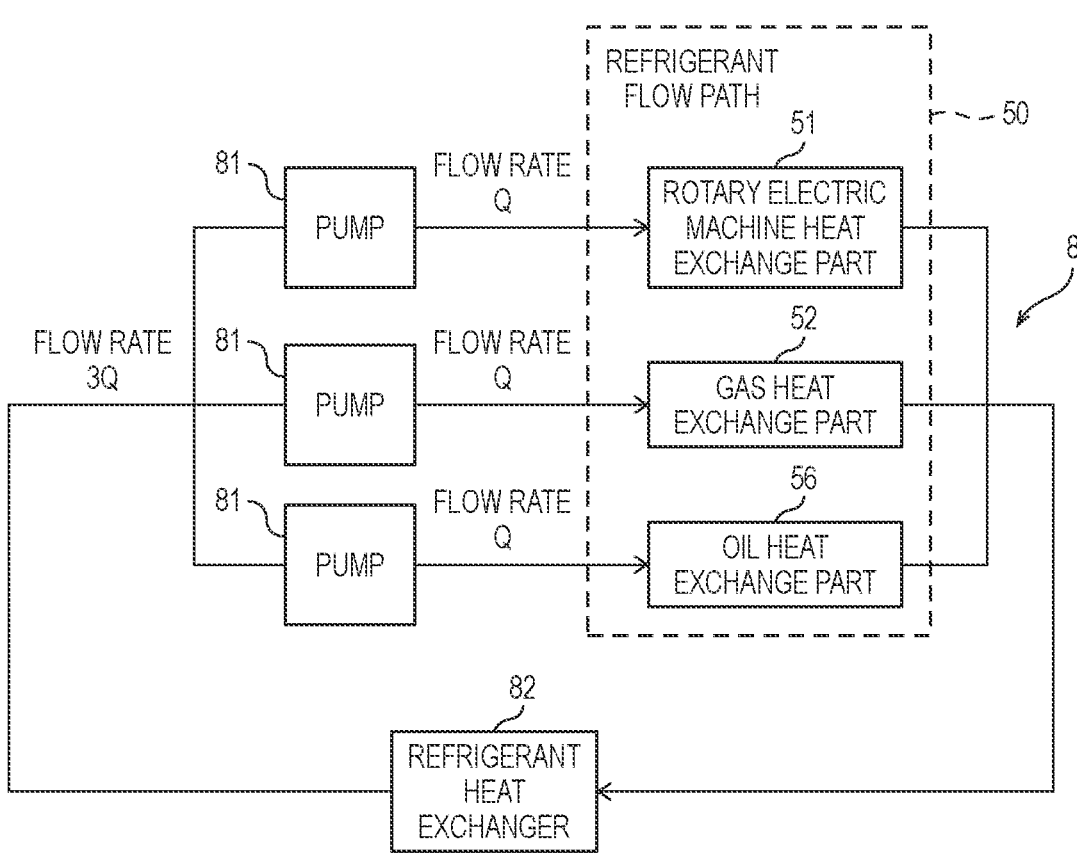
FIG. 11 is a diagram showing the refrigerant flow path 50 of a second comparative example in which the gas heat exchange part 52, the oil heat exchange part 56, and the rotary electric machine heat exchange part 51 are provided in parallel.

FIG. 11 shows a second comparative example in which the rotary electric machine heat exchange part 51, the gas heat exchange part 52, and the oil heat exchange part 56 are provided in parallel. In the second comparative example, unlike the first second comparative example, the pumps 81 each of which is the same as that in the present embodiment are used instead of the large-capacity pump 81A. In this case, when the flow rate of the refrigerant required for each of the heat exchange parts 51, 52, and 56 is Q, three pumps 81 capable of sending the refrigerant at the flow rate Q to the respective heat exchange parts 51, 52, 56 are required. Meanwhile, in the present embodiment, since only one pump 81 is provided, the number of pumps can be reduced.

In the present embodiment, since the rotary electric machine heat exchange part 51, the gas heat exchange part 52, and the oil heat exchange part 56 are provided in series along the flow direction of the refrigerant, an increase in a total flow rate of the refrigerant flowing through the refrigerant flow path 50 can be prevented. Unlike the case where the heat exchange parts 51, 52, and 56 are provided in parallel, since there is no branch in the flow path, the pressure loss due to the branch can be reduced.

A heat radiation amount of the rotary electric machine 10 is large due to high-speed rotation. Accordingly, the heat radiation amount of the rotary electric machine 10 is larger than heat radiation amounts of the compressed air and the oil flowing through the gas flow paths 30 and the oil flow paths 40.

In consideration of the heat radiation amounts of the rotary electric machine 10, the gas flow paths 30, and the oil flow paths 40, the rotary electric machine heat exchange part 51 is provided downstream of the gas heat exchange parts 52 and the oil heat exchange parts 56 in the flow direction of the refrigerant. Since the rotary electric machine heat exchange part 51 is provided on the downstream side, the refrigerant exchanges heat with the compressed air and the oil before a temperature thereof rises due to heat exchange with the rotary electric machine 10, so that the refrigerant can sufficiently cool the compressed air and the oil. Further, since the heat radiation amounts of the compressed air and the oil are smaller than the heat radiation amount of the rotary electric machine 10, the temperature of the refrigerant does not greatly rise even after heat exchange with the compressed air and the oil. Accordingly, the heat exchange efficiency between the refrigerant in the rotary electric machine heat exchange part 51 and the rotary electric machine 10 is still high even after the refrigerant exchanges heat with the compressed air and the oil.

As described above, by providing the heat exchange parts 51, 52, and 56 in series and providing the rotary electric machine heat exchange part 51 downstream of the gas heat exchange part 52 and the oil heat exchange part 56, the high heat exchange efficiency can be achieved while preventing an increase in the total flow rate of the refrigerant.

Figure 12:
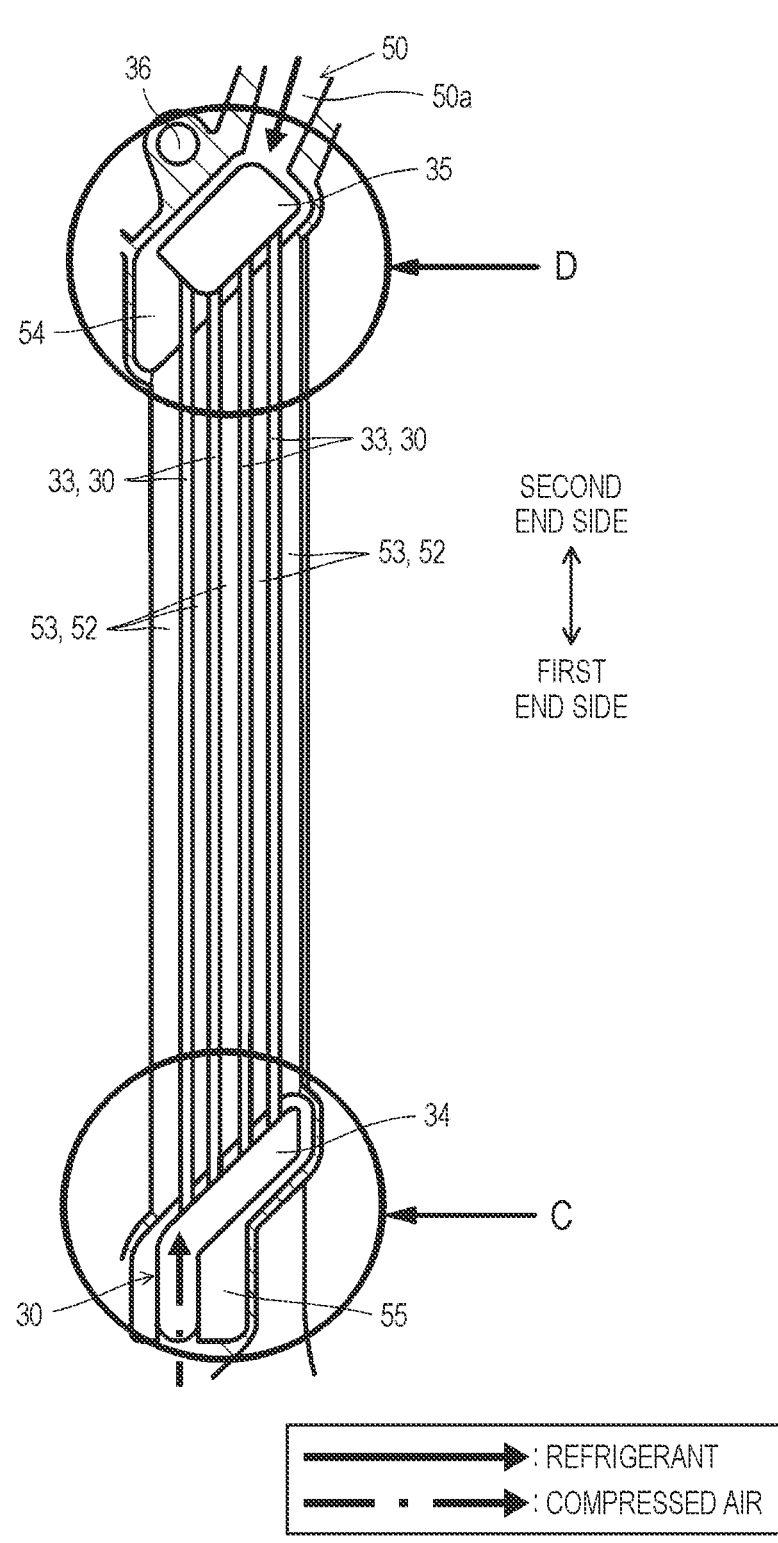
FIG. 12 is a cross-sectional view taken along a line B-B of FIG. 6, and is a view showing details of the gas flow path 30 and the gas heat exchange part 52 of the refrigerant flow path 50.
Figure 13:
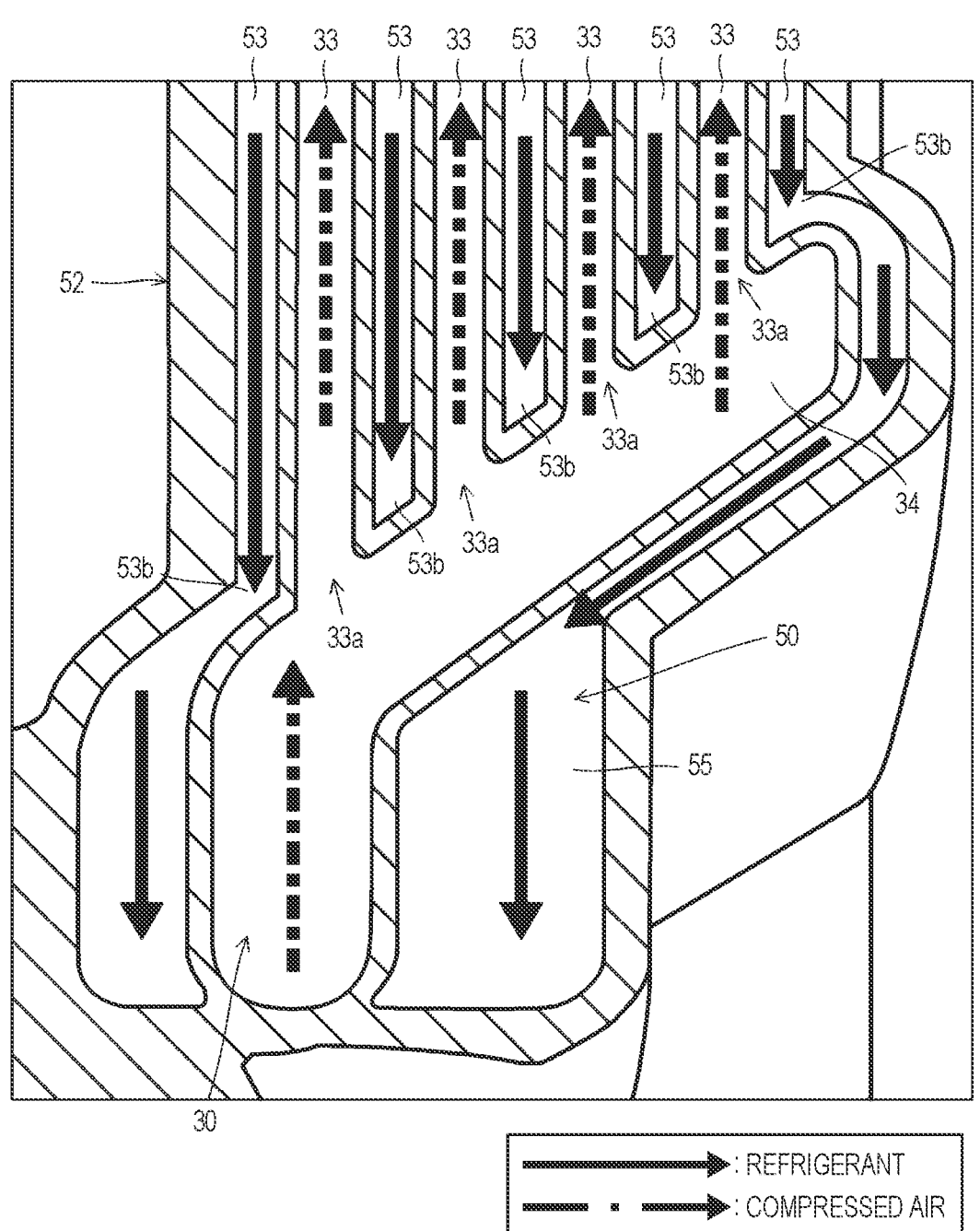
FIG. 13 is an enlarged view of a portion C in FIG. 12.
Figure 14:
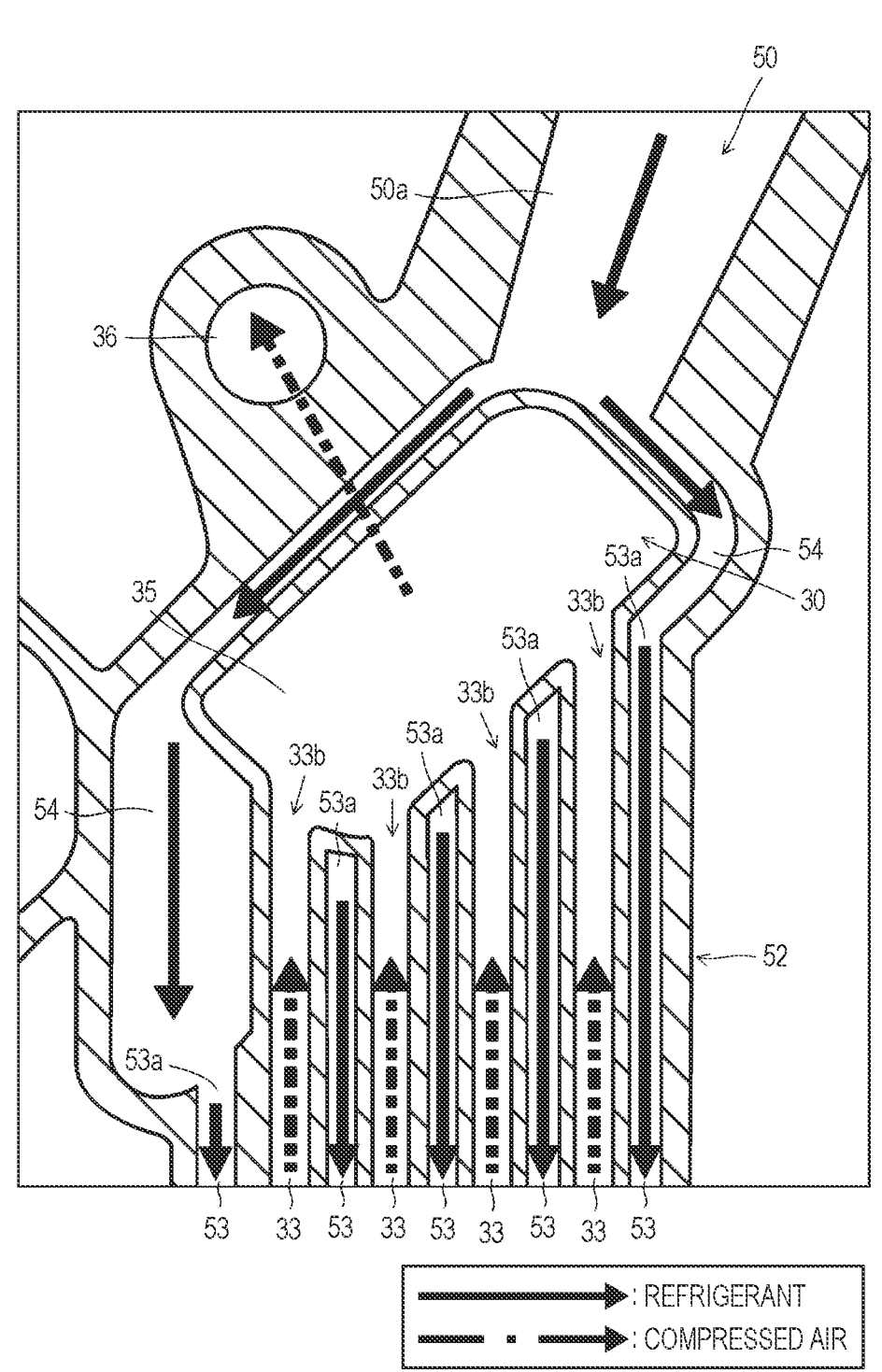
FIG. 14 is an enlarged view of a portion D in FIG. 12.
Figure 15:
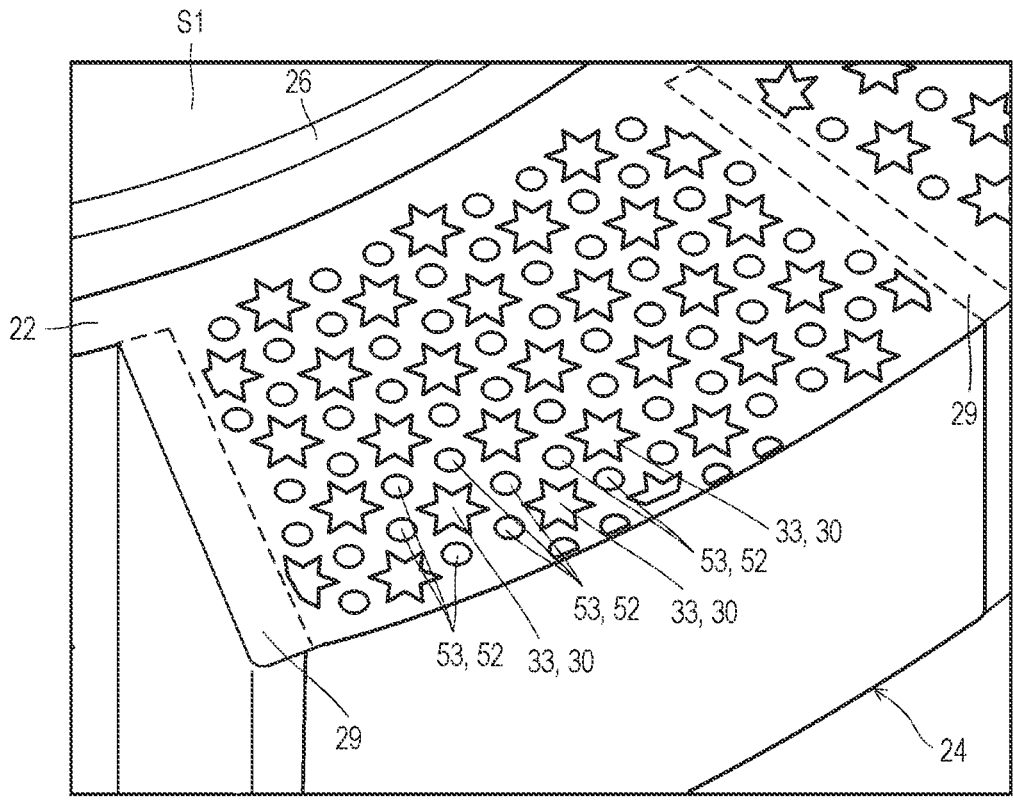
FIG. 15 is a view showing cross sections of linear portions 33 of the gas flow path 30 and linear portions 53 of the gas heat exchange part 52.

Next, structures of the gas flow path 30 and the gas heat exchange part 52 will be described in detail. FIG. 12 is a cross-sectional view taken along a line B-B in FIG. 6. FIGS. 13 and 14 are enlarged views of portions C and D in FIG. 12, respectively. FIG. 15 is a perspective view showing a flow path cross section of the gas flow path 30 and the gas heat exchange part 52.

As shown in FIG. 12, the gas flow path 30 and the gas heat exchange part 52 respectively include a plurality of linear portions 33 and a plurality of linear portions 53, and each of the linear portions 33 and 53 extends in the axial direction of the rotary electric machine 10. As shown in FIG. 15, the plurality of linear portions 33 of the gas flow path 30 are arranged in a staggered manner, and each linear portion 33 is surrounded by a plurality of linear portions 53 of the gas heat exchange part 52 with a wall portion interposed therebetween. This arrangement can improve the heat exchange efficiency between the compressed air and the refrigerant. In the present embodiment, a cross section of each linear portion 33 of the gas flow path 30 has a six-column star shape, and a cross section of each linear portion 53 of the gas heat exchange part 52 has a circular shape, but the cross sections may be any shape.

As shown in FIGS. 12 to 14, a flow direction of the compressed air flowing through the linear portion 33 of the gas flow path 30 is opposite to a flow direction of the refrigerant flowing through the linear portion 53 of the gas heat exchange part 52. That is, the compressed air and the refrigerant form counter flows. Specifically, the compressed air in the gas flow path 30 flows from the first end side toward the second end side in the axial direction, and the refrigerant in the gas heat exchange part 52 flows from the second end side toward the first end side.

As shown in FIG. 13, the gas flow path 30 is provided with an inflow-side gas chamber 34 which is in communication with inflow ports 33a of the respective linear portions 33 and into which the compressed air to be introduced into the linear portions 33 flows. Further, as shown in FIG. 14, the gas heat exchange part 52 is provided with an inflow-side refrigerant chamber 54 which is in communication with inflow ports 53a of the respective linear portions 53 and into which the refrigerant to be introduced into the linear portions 53 flows. The compressed air and the refrigerant are temporarily stored in the inflow-side gas chamber 34 and the inflow-side refrigerant chamber 54, respectively. Since the inflow ports 33a of the respective linear portions 33 of the gas flow path 30 are in communication with the inflow-side gas chamber 34, and the inflow ports 53a of the respective linear portions 53 of the gas heat exchange part 52 are in communication with the inflow-side refrigerant chamber 54, counter flows of the compressed air and the refrigerant can be formed as described above. With the counter flows, the heat exchange efficiency between the compressed air and the refrigerant can be improved in a limited space of the housing 20 without increasing a size of the gas heat exchange part 52.

As shown in FIG. 14, the gas flow path 30 is provided with an outflow-side gas chamber 35 which is in communication with outflow ports 33b of the respective linear portions 33 and collects the compressed air flowing out from the linear portions 33. Further, as shown in FIG. 13, the gas heat exchange part 52 is provided with an outflow-side refrigerant chamber 55 which is in communication with the outflow ports 53b of the respective linear portions 53 and collects the refrigerant flowing out from the linear portions 53. The compressed air and the refrigerant are temporarily stored in the outflow-side gas chamber 35 and the outflow-side refrigerant chamber 55, respectively. The compressed air flowing out from the outflow ports 33b of the respective linear portions 33 of the gas flow path 30 and the refrigerant flowing out from the outflow ports 53b of the respective linear portions 53 of the gas heat exchange part 52 can be respectively collected by the outflow-side gas chamber 35 and the outflow-side refrigerant chamber 55.

The outer wall 22 of the body portion 21 is provided with a relay flow path 36 which is in communication with the outflow-side gas chamber 35 and the gas supply part 30a. The compressed air collected in the outflow-side gas chamber 35 is introduced into the accommodation space S1 from the gas supply part 30a via the relay flow path 36. The outflow-side refrigerant chamber 55 is in communication with the relay flow path 60, and the refrigerant collected in the outflow-side refrigerant chamber 55 flows to the relay flow path 60.

As shown in FIGS. 12 to 14, the inflow-side gas chamber 34 of the gas flow path 30 is provided on an inner side of the outflow-side refrigerant chamber 55 of the gas heat exchange part 52, and the outflow-side gas chamber 35 of the gas flow path 30 is provided on an inner side of the inflow-side refrigerant chamber 54 of the gas heat exchange part 52. Since a configuration in which the compressed air is surrounded by the refrigerant is formed, the heat exchange efficiency between the compressed air and the refrigerant can be improved.

Figure 16:
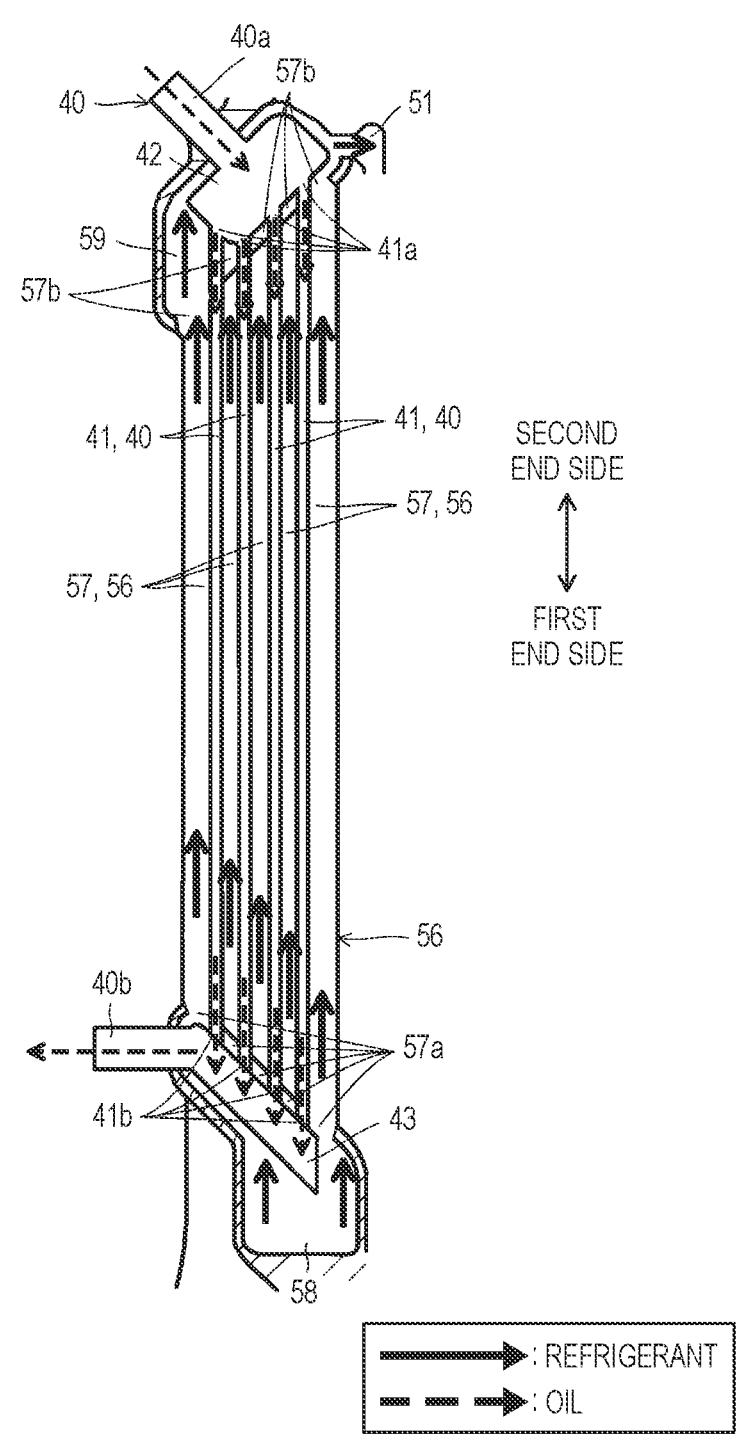
FIG. 16 is a cross-sectional view taken along a line E-E of FIG. 6, and is a view showing details of the oil flow path 40 and the oil heat exchange part 56 of the refrigerant flow path 50.
Figure 17:
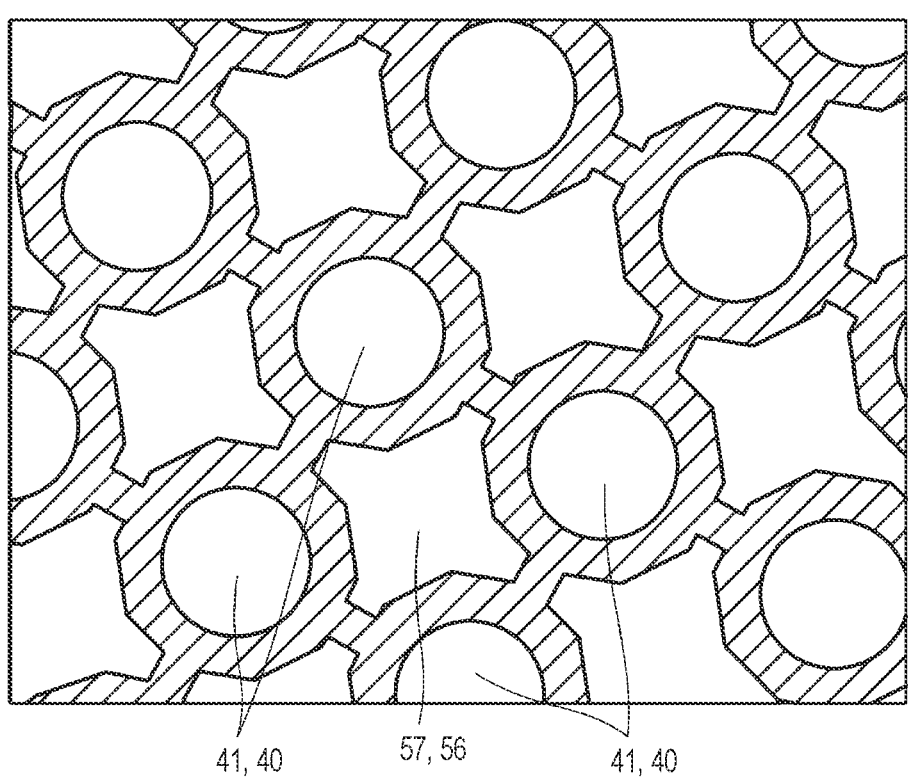
FIG. 17 is a cross-sectional view of linear portions 41 of the oil flow path 40 and linear portions 57 of the oil heat exchange part 56.

Next, structures of the oil flow path 40 and the oil heat exchange part 56 will be described in detail. FIG. 16 is a cross-sectional view taken along a line E-E in FIG. 6, and shows details of the oil flow path 40 and the oil heat exchange part 56. FIG. 17 is a flow path cross-sectional view of the oil flow path 40 and the oil heat exchange part 56.

As shown in FIG. 16, the oil flow path 40 and the oil heat exchange part 56 respectively includes a plurality of linear portions 41 and a plurality of linear portions 57, and each of the linear portions 41 and 57 extends in the axial direction of the rotary electric machine 10. As shown in FIG. 17, each linear portion 41 of the oil flow path 40 is surrounded by a plurality of linear portions 57 of the oil heat exchange part 56 with a wall portion interposed therebetween. This arrangement can improve the heat exchange efficiency between the oil and the refrigerant.

A flow direction of the oil flowing through the linear portion 41 of the oil flow path 40 is opposite to a flow direction of the refrigerant flowing through the linear portion 57 of the oil heat exchange part 56. That is, the oil and the refrigerant form counter flows. Specifically, the oil in the oil flow path 40 flows from the second end side toward the first end side in the axial direction, and the refrigerant in the oil heat exchange part 56 flows from the first end side toward the second end side.

The oil flow path 40 is provided with an inflow-side oil chamber 42 which is in communication with inflow ports 41a of the respective linear portions 41 and into which the oil to be introduced into the linear portions 41 flows. The inflow-side oil chamber 42 is in communication with the oil inflow ports 40a. Further, the oil heat exchange part 56 is provided with an inflow-side refrigerant chamber 58 which is in communication with inflow ports 57a of the respective linear portions 57 and into which the refrigerant to be introduced into the linear portions 57 flows. The inflow-side refrigerant chamber 58 is in communication with the relay flow path 60 (see FIG. 6). The oil and the refrigerant are temporarily stored in the inflow-side oil chamber 42 and the inflow-side refrigerant chamber 58, respectively. Since the inflow ports 41a of the respective linear portions 41 of the oil flow path 40 are in communication with the inflow-side oil chamber 42, and the inflow ports 57a of the respective linear portions 57 of the oil heat exchange part 56 are in communication with the inflow-side refrigerant chamber 58, counter flows of the oil and the refrigerant can be formed as described above. With the counter flows, the heat exchange efficiency between the oil and the refrigerant can be improved in a limited space of the housing 20 without increasing a size of the oil heat exchange part 56.

Further, the oil flow path 40 is provided with an outflow-side oil chamber 43 which is in communication with outflow ports 41b of the respective linear portions 41 and collects the oil flowing out from the linear portions 41. Further, the oil heat exchange part 56 is provided with an outflow-side refrigerant chamber 59 which is in communication with outflow ports 57b of the respective linear portions 57 and collects the refrigerant flowing out from the linear portions 57. The oil and the refrigerant are temporarily stored in the outflow-side oil chamber 43 and the outflow-side refrigerant chamber 59, respectively. With such a configuration, the oil flowing out from the outflow ports 41b of the respective linear portions 41 of the oil flow path 40 can be collected, and the refrigerant flowing out from the outflow ports 57b of the respective linear portions 57 of the oil heat exchange part 56 can be collected.

The outflow-side oil chamber 43 is in communication with the oil outflow ports 40b, and the oil collected in the outflow-side oil chamber 43 is supplied from the oil supply port 46 to the accommodation space S1 through a connection pipe (not shown) starting from the oil outflow port 40b. The outflow-side refrigerant chamber 59 is in communication with the rotary electric machine heat exchange part 51, and the refrigerant collected in the outflow-side refrigerant chamber 59 flows to the rotary electric machine heat exchange part 51 (see FIG. 7).

The inflow-side oil chamber 42 of the oil flow path 40 is provided on an inner side of the outflow-side refrigerant chamber 59 of the oil heat exchange part 56, and the outflow-side oil chamber 43 of the oil flow path 40 is provided on an inner side of the inflow-side refrigerant chamber 58 of the oil heat exchange part 56. Since the oil is surrounded by the refrigerant, the heat exchange efficiency between the oil and the refrigerant can be improved.

With reference to FIGS. 3 and 4 again, the arrangement of the gas flow path 30, the gas heat exchange part 52, the oil flow path 40, and the oil heat exchange part 56 will be described.

The gas flow path 30 and the gas heat exchange part 52 are provided between adjacent ribs 29. The oil flow path 40 and the oil heat exchange part 56 are provided between adjacent ribs 29 at a position different from that of the gas flow path 30 and the gas heat exchange part 52. When the rotary electric machine 10 rotates at high speed, a large load is applied to the housing 20 by a centrifugal force. However, since the gas flow path 30, the gas heat exchange part 52, the oil flow path 40, and the oil heat exchange part 56 are provided between the adjacent ribs 29, the loads applied to the gas flow path 30, the gas heat exchange part 52, the oil flow path 40, and the oil heat exchange part 56 can be blocked, and the durability and the reliability of these can be improved.

Further, the gas flow path 30 and the gas heat exchange part 52 are provided continuously with the adjacent ribs 29. Similarly, the oil flow path 40 and the oil heat exchange part 56 are provided continuously with the adjacent ribs 29. Since the gas flow path 30, the gas heat exchange part 52, the oil flow path 40, and the oil heat exchange part 56 are provided continuously (that is, integrally) with the ribs 29, loads applied to the gas flow path 30, the gas heat exchange part 52, the oil flow path 40, and the oil heat exchange part 56 can be blocked.

A plurality of (three in the present embodiment) gas flow paths 30 and gas heat exchange parts 52 are provided, and each gas flow path 30 and each gas heat exchange part 52 are provided between adjacent ribs 29. By providing a plurality of gas flow paths 30 and gas heat exchange parts 52, a flow path cross-sectional area is increased, so that a flow rate of the compressed air supplied to the accommodation space S1 can be increased, and a flow rate of the refrigerant can be increased to sufficiently cool the compressed air.

Similarly, a plurality of (three in the present embodiment) oil flow paths 40 and oil heat exchange parts 56 are provided, and each oil flow path 40 and each oil heat exchange part 56 are provided between adjacent ribs 29. By providing a plurality of oil flow paths 40 and oil heat exchange parts 56, a flow path cross-sectional area is increased, so that a flow rate of the oil supplied to the accommodation space S1 can be increased, and a flow rate of the refrigerant can be increased to sufficiently cool the oil.

(Manufacturing Method of Rotary Electric Machine Housing)

The housing 20 according to the present embodiment is integrally formed by, for example, additive manufacture technology (hereinafter also referred to as AM technology) that can manufacture a component having a complicated three-dimensional shape by stacking and solidifying metal powder materials on a one layer basis. According to the AM technology, it is possible to manufacture a component having a fine and complicated three-dimensional shape which is difficult to manufacture by a manufacturing method in the related art such as machining and casting.

In the present embodiment, the body portion 21, the gas flow path 30, the oil flow path 40, and the refrigerant flow path 50 are integrally formed by AM technology. The gas flow path 30, the oil flow path 40, and the refrigerant flow path 50 of the present embodiment each have a fine and complicated shape, but can be integrally formed by, for example, stacking and solidifying a metal powder material on a one layer basis from the bottom wall 27 toward the second end side.

Although an embodiment of the present disclosure has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, respective constituent elements in the above embodiment may be freely combined without departing from the gist of the invention.

For example, in the above-described embodiment, the oil heat exchange part 56 of the refrigerant flow path 50 is provided downstream of the gas heat exchange part 52, but the oil heat exchange part 56 may be provided upstream of the gas heat exchange part 52.

In the above-described embodiment, three gas flow paths 30 and three gas heat exchange parts 52 are provided, and three oil flow paths 40 and three oil heat exchange parts 56 are provided. For example, only one gas flow path 30 and one gas heat exchange part 52 may be provided, or only one oil flow path 40 and one oil heat exchange part 56 may be provided.

In the present description, at least the following matters are described. In the parentheses, the corresponding constituent elements and the like in the embodiment described above are shown as an example, but the invention is not limited thereto.

(1) A rotary electric machine housing (rotary electric machine housing 20) configured to accommodate a rotary electric machine (rotary electric machine 10), the rotary electric machine housing including:

a body portion (body portion 21) having an accommodation space (accommodation space S1) in which the rotary electric machine is accommodated;

a gas flow path (gas flow path 30) provided in the body portion and through which a gas (compressed air) to be supplied to the rotary electric machine flows;

an oil flow path (oil flow path 40) provided in the body portion and through which an oil to be supplied to the rotary electric machine flows; and a refrigerant flow path (refrigerant flow path 50) provided in the body portion and through which a refrigerant flows inside, in which the refrigerant flow path includes:

a rotary electric machine heat exchange part (rotary electric machine heat exchange part 51) in which the refrigerant exchanges heat with the rotary electric machine;

a gas heat exchange part (gas heat exchange part 52) in which the refrigerant exchanges heat with the gas flowing through the gas flow path; and an oil heat exchange part (oil heat exchange part 56) in which the refrigerant exchanges heat with the oil flowing through the oil flow path, and the rotary electric machine heat exchange part, the gas heat exchange part, and the oil heat exchange part are provided in series along a flow direction of the refrigerant.

When the rotary electric machine heat exchange part, the gas heat exchange part, and the oil heat exchange part are provided in parallel, it is necessary to increase a total flow rate of the refrigerant in order to cause the refrigerant to flow at a required flow rate. According to the above (1), since the rotary electric machine heat exchange part, the gas heat exchange part, and the oil heat exchange part are provided in series along the flow direction of the refrigerant, an increase in the total flow rate of the refrigerant can be prevented.

(2) The rotary electric machine housing according to (1), in which the rotary electric machine heat exchange part is provided downstream of the gas heat exchange part and the oil heat exchange part in the flow direction of the refrigerant.

According to the above (2), since the rotary electric machine heat exchange part for performing heat exchange with the rotary electric machine having a large heat radiation amount is provided on the downstream side in the refrigerant flow path, the refrigerant exchanges heat with the gas and the oil before a temperature thereof rises. Thus, the gas and the oil can be sufficiently cooled. As a result, the high heat exchange efficiency can be achieved while preventing an increase in the total flow rate of the refrigerant.

(3) The rotary electric machine housing according to (1) or (2),
in which the gas flow path and the gas heat exchange part of the refrigerant flow path extend in an axial direction of the rotary electric machine, and
a flow direction of the refrigerant flowing through the gas heat exchange part is opposite to a flow direction of the gas flowing through the gas flow path.

According to the above (3), since counter flows are formed between the gas and the refrigerant, the heat exchange efficiency between the gas and the refrigerant can be improved.

(4) The rotary electric machine housing according to any one of (1) to (3),
in which the oil flow path and the oil heat exchange part of the refrigerant flow path extend in an axial direction of the rotary electric machine, and
a flow direction of the refrigerant flowing through the oil heat exchange part is opposite to a flow direction of the oil flowing through the oil flow path.

According to the above (4), since counter flows are formed between the oil and the refrigerant, the heat exchange efficiency between the oil and the refrigerant can be improved.

(5) The rotary electric machine housing according to any one of (1) to (4),
in which the rotary electric machine heat exchange part has a cylindrical shape, and
the gas heat exchange part and the oil heat exchange part are disposed radially outward of the rotary electric machine heat exchange part.

According the above (5), an increase in a size of the rotary electric machine housing in the axial direction can be prevented.

(6) The rotary electric machine housing according to (5),
in which the body portion includes an outer wall (outer wall 22) having a cylindrical shape, the outer wall includes:
a terminal arrangement portion (terminal arrangement portion 23) provided with an electric terminal for transmitting and receiving electric power between the rotary electric machine and an external device;
a gas flow path arrangement portion (gas flow path arrangement portion 24) provided with the gas flow path and the gas heat exchange part; and
an oil flow path arrangement portion (oil flow path arrangement portion 25) provided with the oil flow path and the oil heat exchange part, and
the terminal arrangement portion, the gas flow path arrangement portion, and the oil flow path arrangement portion are arranged at intervals of about 120 degrees in a circumferential direction of the body portion.

According to the above (6), deviation of a position of the center of gravity of the rotary electric machine housing can be prevented.

(7) A manufacturing method of manufacturing the rotary electric machine housing according to any one of (1) to (6) by additive manufacture, the manufacturing method including:
integrally forming the body portion, the gas flow path, the oil flow path, and the refrigerant flow path.

According to the above (7), the body portion, the gas flow path, the oil flow path, and the refrigerant flow path can be integrally formed by the additive manufacture. Accordingly, it is possible to form the gas flow path, the oil flow path, and the refrigerant flow path each having a complicated shape in which heat exchange between the gas and the refrigerant and heat exchange between the oil and the refrigerant can be efficiently performed.

What is claimed is:
1. A rotary electric machine housing configured to accommodate a rotary electric machine, the rotary electric machine housing comprising:
a body portion having an accommodation space in which the rotary electric machine is accommodated;
a gas flow path provided in the body portion and through which a gas to be supplied to the rotary electric machine flows;
an oil flow path provided in the body portion and through which an oil to be supplied to the rotary electric machine flows; and
a refrigerant flow path provided in the body portion and through which a refrigerant flows inside,
wherein the refrigerant flow path includes:
a rotary electric machine heat exchange part in which the refrigerant exchanges heat with the rotary electric machine;
a gas heat exchange part in which the refrigerant exchanges heat with the gas flowing through the gas flow path; and
an oil heat exchange part in which the refrigerant exchanges heat with the oil flowing through the oil flow path, and
the rotary electric machine heat exchange part, the gas heat exchange part, and the oil heat exchange part are provided in series along a flow direction of the refrigerant.
2. The rotary electric machine housing according to claim 1,
wherein the rotary electric machine heat exchange part is provided downstream of the gas heat exchange part and the oil heat exchange part in the flow direction of the refrigerant.

3. The rotary electric machine housing according to claim 1, wherein the gas flow path and the gas heat exchange part of the refrigerant flow path extend in an axial direction of the rotary electric machine, and a flow direction of the refrigerant flowing through the gas heat exchange part is opposite to a flow direction of the gas flowing through the gas flow path.

4. The rotary electric machine housing according to claim 1, wherein the oil flow path and the oil heat exchange part of the refrigerant flow path extend in an axial direction of the rotary electric machine, and a flow direction of the refrigerant flowing through the oil heat exchange part is opposite to a flow direction of the oil flowing through the oil flow path.

5. The rotary electric machine housing according to claim 1, wherein the rotary electric machine heat exchange part has a cylindrical shape, and the gas heat exchange part and the oil heat exchange part are disposed radially outward of the rotary electric machine heat exchange part.

6. The rotary electric machine housing according to claim 5, wherein the body portion includes an outer wall having a cylindrical shape, the outer wall includes:

a terminal arrangement portion provided with an electric terminal for transmitting and receiving electric power between the rotary electric machine and an external device;

a gas flow path arrangement portion provided with the gas flow path and the gas heat exchange part; and an oil flow path arrangement portion provided with the oil flow path and the oil heat exchange part, and the terminal arrangement portion, the gas flow path arrangement portion, and the oil flow path arrangement portion are arranged at intervals of about 120 degrees in a circumferential direction of the body portion.

7. A manufacturing method of manufacturing the rotary electric machine housing according to claim 1 by additive manufacture, the manufacturing method comprising:

integrally forming the body portion, the gas flow path, the oil flow path, and the refrigerant flow path.

8. The rotary electric machine housing according to claim 1, wherein each of the gas heat exchange part and the oil heat exchange part partially overlaps the rotary electric machine as viewed from a rotor shaft of the rotary electric machine in a radial direction.

9. The rotary electric machine housing according to claim 1, wherein the gas is surrounded by the refrigerant.

10. The rotary electric machine housing according to claim 1, wherein the oil is surrounded by the refrigerant.

11. The rotary electric machine housing according to claim 1, wherein the gas flow path and the gas heat exchange part are provided between adjacent ribs.

\* \* \* \* \*